(12) United States Patent
Koo et al.

(10) Patent No.: US 11,513,659 B2
(45) Date of Patent: Nov. 29, 2022

(54) ELECTRONIC DEVICE AND METHOD FOR PROVIDING USER INTERFACE FOR SETTING AND EXECUTING VARIOUS FUNCTIONS THEREOF

(71) Applicant: Samsung Electronics Co., Ltd., Suwon-si (KR)

(72) Inventors: Jaok Koo, Suwon-si (KR); Sunmi Jin, Suwon-si (KR); Suhyun Na, Suwon-si (KR); Pius Lee, Suwon-si (KR); Jongkee Lee, Suwon-si (KR); Heeyoung Chung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/421,234

(22) PCT Filed: Sep. 17, 2019

(86) PCT No.: PCT/KR2019/011960
§ 371 (c)(1),
(2) Date: Jul. 7, 2021

(87) PCT Pub. No.: WO2020/145476
PCT Pub. Date: Jul. 16, 2020

(65) Prior Publication Data
US 2022/0121347 A1 Apr. 21, 2022

(30) Foreign Application Priority Data

Jan. 7, 2019 (KR) .................. 10-2019-0001628

(51) Int. Cl.
*G06F 17/00* (2019.01)
*G06F 3/04817* (2022.01)
(Continued)

(52) U.S. Cl.
CPC ......... *G06F 3/04817* (2013.01); *G04G 9/007* (2013.01); *G06F 1/163* (2013.01);
(Continued)

(58) Field of Classification Search
CPC .... G06F 3/04817; G06F 1/163; G06F 3/0482; G06F 3/0486; G06F 3/04883; G06F 1/16;
(Continued)

(56) References Cited

U.S. PATENT DOCUMENTS 6,525,997 B1 * 2/2003 Narayanaswami .... G04G 11/00
368/80
9,241,060 B1 * 1/2016 Fujisaki .................. H04W 4/02
(Continued)

FOREIGN PATENT DOCUMENTS

KR 10-2016-0030832 A 3/2016
KR 10-2016-0101951 A 8/2016
(Continued)

*Primary Examiner* — Laurie A Ries
(74) *Attorney, Agent, or Firm* — Jefferson IP Law, LLP

(57) ABSTRACT

A method for executing a function of an electronic device is provided. The method includes the operations of displaying a virtual clock user interface (UI) indicating a virtual time, and an icon list UI including icons corresponding to a plurality of functions, respectively, acquiring first input data according to a user input for selecting one time by using the displayed virtual clock UI, and second input data according to a user input for selecting one icon from the icon list UI, performing control, on the basis of the first input data and the second input data, so that a function corresponding to the selected icon is executed at the selected one time, and highlighting the selected icon as the virtual time reaches the one time, and executing the function corresponding to the selected icon as the current time reaches the one time.

13 Claims, 30 Drawing Sheets

(51) Int. Cl.

| | | |
|---|---|---|
| *G04G 9/00* | (2006.01) | |
| *G06F 1/16* | (2006.01) | |
| *G06F 3/0482* | (2013.01) | |
| *G06F 3/0486* | (2013.01) | |
| *G06F 3/04883* | (2022.01) | |

(52) U.S. Cl.
CPC .......... *G06F 3/0482* (2013.01); *G06F 3/0486* (2013.01); *G06F 3/04883* (2013.01)

(58) Field of Classification Search
CPC .... G06F 3/0481; G06F 3/0484; G06F 3/0488; G06F 3/04842; G04G 9/007; G04G 9/0064; G04G 15/006; G04G 21/08; G06Q 10/10; G06Q 10/109
See application file for complete search history.

(56) References Cited

U.S. PATENT DOCUMENTS

| | | | |
|---|---|---|---|
| 10,114,342 | B2 | 10/2018 | Kim et al. |
| 10,452,224 | B2 | 10/2019 | Jang et al. |
| 10,656,601 | B2 | 5/2020 | Cho et al. |
| 10,936,142 | B2 | 3/2021 | Cho |
| 11,431,584 | B2* | 8/2022 | Gao ........................ G06F 9/542 |
| 2015/0205509 | A1* | 7/2015 | Scriven ................... G04G 11/00 |
| | | | 715/834 |
| 2016/0179353 | A1 | 6/2016 | Iskander |
| 2016/0188125 | A1* | 6/2016 | Kaplan ................. G06F 3/0481 |
| | | | 715/730 |
| 2016/0259488 | A1* | 9/2016 | Chan ................... G06Q 30/0235 |
| 2016/0283094 | A1* | 9/2016 | Choi ................... G06F 3/04842 |
| 2016/0313869 | A1* | 10/2016 | Jang ........................ G04G 9/00 |
| 2016/0357151 | A1 | 12/2016 | Block et al. |
| 2017/0039535 | A1* | 2/2017 | Park ....................... G06Q 20/42 |
| 2020/0110524 | A1* | 4/2020 | Lemay ................. G06F 3/0488 |
| 2020/0249632 | A1* | 8/2020 | Olwal .................. G04B 47/063 |
| 2020/0356242 | A1* | 11/2020 | Wilson ................... G06T 13/80 |
| 2022/0269333 | A1* | 8/2022 | Dedonato ............. G04G 9/007 |

FOREIGN PATENT DOCUMENTS

| | | |
|---|---|---|
| KR | 10-2016-0126446 A | 11/2016 |
| KR | 10-2017-0006761 A | 1/2017 |
| KR | 10-2017-0016262 A | 2/2017 |
| KR | 10-2018-0104495 A | 9/2018 |

\* cited by examiner (3-a)

ELECTRONIC DEVICE AND METHOD FOR PROVIDING USER INTERFACE FOR SETTING AND EXECUTING VARIOUS FUNCTIONS THEREOF

CROSS-REFERENCE TO RELATED APPLICATION(S)

This application is a U.S. National Stage application under 35 U.S.C. § 371 of an International application number PCT/KR2019/011960, filed on Sep. 17, 2019, which is based on and claimed priority of a Korean patent application number 10-2019-0001628, filed on Jan. 7, 2019, in the Korean Intellectual Property Office, the disclosure of which is incorporated by reference herein in its entirety.

BACKGROUND

1. Field

The disclosure relates to an electronic device and a method for executing a function thereof. More particularly, the disclosure relates to a method for executing a time-related function and a device therefor.

2. Description of Related Art

Various services and additional functions provided by an electronic device have been gradually expanding. In order to increase effective values of the electronic device and satisfy various users' needs, communication service providers and electronic device manufacturers have provided various functions and, for differentiation from other companies, competitively developed an electronic device and various applications which can be executed by the electronic device. The users can be provided with various type of information by using various applications applied to the electronic.

For example, the electronic device may provide a user with a time-related function. Specifically, the electronic device may provide various time-related functions such as an alarm function, a schedule management function, and a weather forecast function. In this case, in order to receive various functions, a user may configure time with respect to the electronic device and perform a user input of selecting a detailed function required for the use of a function.

The above information is presented as background information only to assist with an understanding of the disclosure. No determination has been made, and no assertion is made, as to whether any of the above might be applicable as prior art with regard to the disclosure.

SUMMARY

When an electronic device is a portable electronic device such as a smartphone, the size of a display thereof is relatively small, and thus it may be difficult to simultaneously display a large amount of data or information. Moreover, when the electronic device is a wearable device such as a smartwatch, the user may find difficulty in promptly and correctly performing input due to the input space constraint.

In addition, in the process of configuring the time-related function, the user needs to enter a menu of each function to configure time. Specifically, even when the user configures multiple functions by using the identical time, the user needs to enter a menu of each function and repetitively perform a user input inconveniently.

Aspects of the disclosure are to address at least the above-mentioned problems and/or disadvantages and to provide at least the advantages described below. Accordingly, an aspect of the disclosure is to provide an apparatus and method for executing a function thereof.

Additional aspects will be set forth in part in the description which follows and, in part, will be apparent from the description, or may be learned by practice of the presented embodiments.

In accordance with an aspect of the disclosure, a method for executing a function of an electronic device is proved. The method includes displaying a virtual watch user interface (UI) indicating a virtual time point and an icon list UI including icons corresponding to multiple functions, respectively, acquiring first input data according to a user input of selecting one time point by using the displayed virtual watch UI and second input data according to a user input of selecting one icon from the icon list UI, controlling a function corresponding to the selected icon to be executed at the selected one time point, by using the first input data and the second input data, and highlighting the selected icon as the virtual time point reaches the one time point, and executing the function corresponding to the selected icon as current time reaches the one time point.

In accordance with another aspect of the disclosure, an electronic device is provided. The electronic device includes a display, a memory configured to store at least one instruction, and at least one processor operatively connected to the display and the memory. The memory stores at least one instruction configured to cause the at least one processor to control the display to display a virtual watch UI indicating a virtual time point and an icon list UI including icons corresponding to multiple functions, respectively, control, by using first input data according to a user input of selecting one time point by using the displayed virtual watch UI and second input data according to a user input of selecting one icon from the icon list UI, a function corresponding to the selected icon to be executed at the selected one time point, and highlight the selected icon when the virtual time point reaches the one time point, and execute the function corresponding to the selected icon when current time reaches the one time point.

In accordance with another aspect of the disclosure, a non-transitory computer-readable recording medium is provided. The non-transitory computer-readable recording medium includes at least one instruction configured to cause an electronic device to display a virtual watch UI indicating a virtual time point and an icon list UI including icons corresponding to multiple functions, respectively, acquire first input data according to a user input of selecting one time point by using the displayed virtual watch UI and second input data according to a user input of selecting one icon from the icon list UI, control a function corresponding to the selected icon to be executed at the selected one time point, by using the first input data and the second input data, and highlight the selected icon as the virtual time point reaches the one time point, and execute the function corresponding to the selected icon as current time reaches the one time point.

According to the disclosure, user input stages required to configure a function can be remarkably reduced.

For example, in the manner, when the user configures an alarm and a schedule for a specific time point, the user needs to select an alarm function by rotating a bezel in a function selection menu, enters an alarm configuration menu, configure time by rotating the bezel, store the time related to the configured alarm, and then escape from the alarm configuration menu. Then, the user selects a schedule function by rotating the bezel again in the function selection menu, configures time again by rotating the bezel, stores the time related to the configured schedule, and then escapes from the schedule configuration menu.

However, according to the disclosure, the user can configure a function to be executed at a particular time point according the smallest number of input stages by rotating an hour hand or a bezel to configure time, and selecting at least one function (e.g., an alarm function, a schedule function, and an information provision function) to be executed at the corresponding time point from one menu.

In other words, the user can configure an execution time point for one or more functions at a time point without entering each execution screen of an application. In addition, the user can configure time consecutively for multiple functions, and the more the situations of configuring the time, the number of user input stages can be more remarkably reduced in comparison with the conventional manner.

In addition, the user may identity (or inquiry of) whether a function is configured, through an interface that is identical to an interface used for the time configuration, and thus the user can use the electronic device more conveniently. Specifically, when functions are configured with respect to multiple time points, the user can comprehensively monitor a change in information provided by the functions over time.

In addition, according to the disclosure, complication information dynamically changes, and thus the user can secure a clear view on identifying the complication information, and complication information appropriate for the user can be display over time. Accordingly, much more enhanced experience and convenience for the user who uses the electronic device can be achieved.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1A:
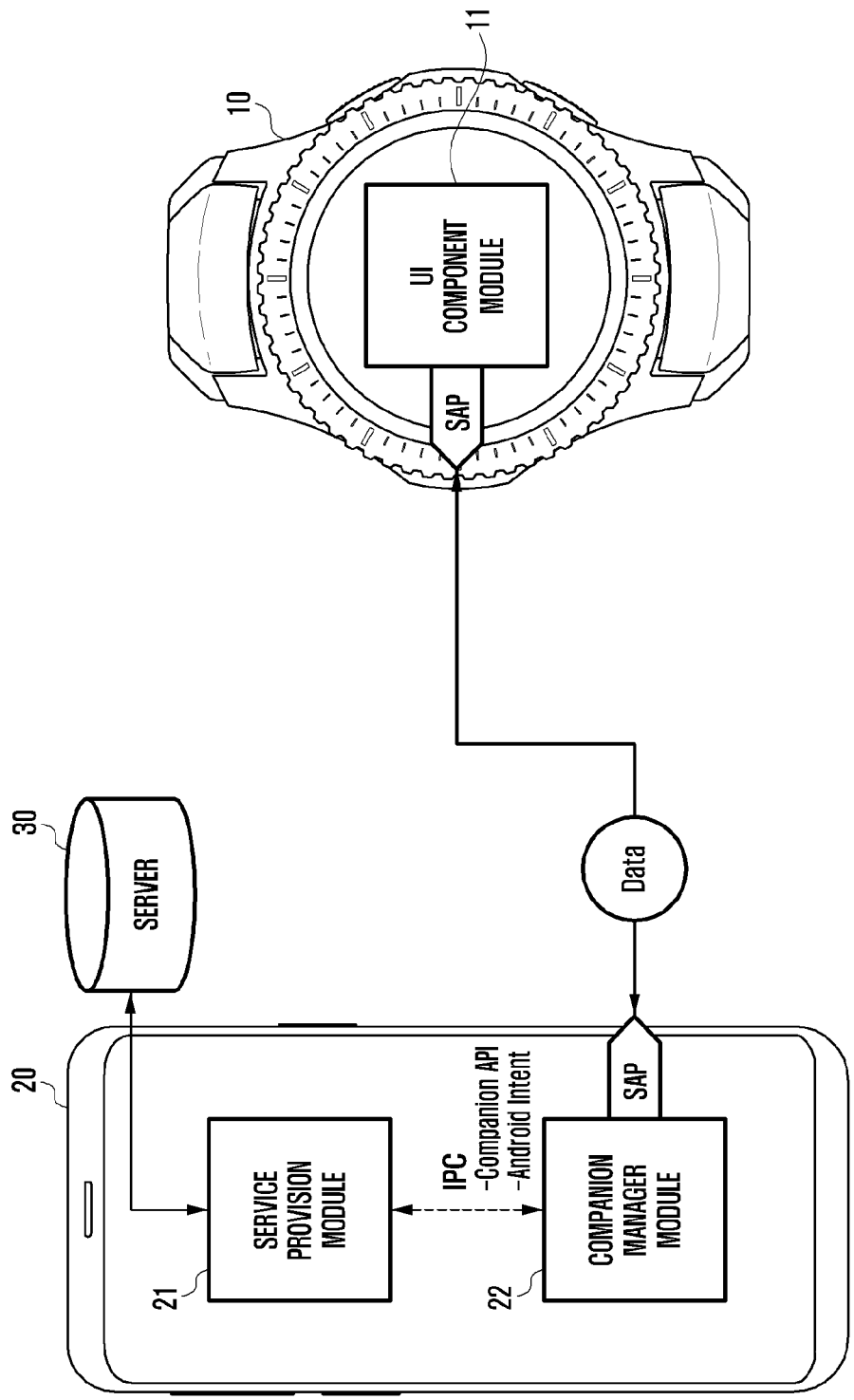
FIG. 1A is a system diagram including an electronic device and an external device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

FIG. 1A is a system diagram including an electronic device and an external device according to an embodiment of the disclosure.

Referring to FIG. 1A, it is assumed that an electronic device 10 is, for example, a smartwatch, but is a device capable of providing time information, and may include at least one of a smartphone, a tablet personal computer (PC), a mobile phone, a video phone, an electronic book reader, a desktop PC, a laptop PC, a netbook computer, an MP3 player, a medical device, a camera, or a wearable device. The wearable device may include at least one of an accessory type (e.g., a watch, a ring, a bracelet, an anklet, a necklace, glasses, contact lenses, or a head-mounted device (HMD)), a fabric or clothing integrated type (e.g., an electronic clothing), a body-mounted type (e.g., a skin pad, or tattoo), or a bio-implantable circuit. In some embodiments, the electronic device may include at least one of, for example, a television, a digital video disk (DVD) player, an audio, a refrigerator, an air conditioner, a vacuum cleaner, an oven, a microwave oven, a washing machine, an air purifier, a set-top box, a home automation control panel, a security control panel, a media box (e.g., Samsung HomeSync™, Apple TV™, or Google TV™), a game console (e.g., Xbox™ and PlayStation™), an electronic dictionary, an electronic key, a camcorder, or an electronic photo frame.

In FIG. 1A, it is assumed that an external device 20 is, for example, a smartphone, but is a device capable of providing time-related information or a time-related function, and may include at least one of a tablet PC, a mobile phone, a video phone, an electronic book reader, a desktop PC, a laptop PC, a netbook computer, an MP3 player, a medical device, a camera, or a wearable device. In some embodiments, the electronic device may include at least one of, for example, a television, a DVD player, an audio, a refrigerator, an air conditioner, a vacuum cleaner, an oven, a microwave oven, a washing machine, an air purifier, a set-top box, a home automation control panel, a security control panel, a media box (e.g., Samsung HomeSync™, Apple TV™, or Google TV™), a game console (e.g., Xbox™ and PlayStation™), an electronic dictionary, an electronic key, a camcorder, an electronic photo frame, or a server.

The electronic device 10 and the external device 20 may be communicatively connected to transmit or receive data. When the electronic device 10 and the external device 20 are communicatively connected, it may include a case in which the electronic device 10 and the external device 20 are connected via a third device. For example, the third device may be, but is not limited to, a relay, a hub, an access point, a server, or a gateway.

The electronic device 10 may acquire information required to use the electronic device 10 from an application (e.g., an app) installed in the external device 20 and provide the same to a user. The information required to use the electronic device 10 may include, for example, time-related data, an attribute value, and the like. For example, in response to an event occurring in the electronic device 10, the external device 20 may provide the electronic device 10 with time-related information linked to the event.

For example, referring to FIG. 1A, the external device 20 may include a service provision module 21 and a companion manager module 22 (e.g., a smartwatch manager module, a gear manager module, and the like). The service provision module 21 may provide a particular function and/or service by one or more applications. In addition, the service provision module 21 may communicate with an external server 30 to provide the electronic device 10 with the particular function and/or service acquired from the external server 30.

The service provision module 21 and the companion manager module 22 may transmit or receive data according to a predefined protocol. For example, the service provision module 21 and the companion manager module 22 may perform inter-process communication (IPC) by using a predefined application program interface (API) intent (e.g., an android intent).

In FIG. 1A, the electronic device 10 may include a user interface (UI) component module 11. The UI component module 11 may configure a user interface to be displayed on the electronic device 10 by using data acquired from the companion manager module 22 or data prestored in the electronic device 10.

The UI component module 11 included in the electronic device 10 and the companion manager module 22 included in the external device 20 may transmit or receive data (e.g., extensible markup language (XML) data) to or from each other according to a predefined protocol (e.g., a Samsung accessory protocol (SAP)).

The data may include, for example, a time configuring function, time-linked information, and the like. The time configuring function may include at least one of, for example, various alarm configurations (e.g., a time configuration, a stock notification configuration, etc.), a schedule configuration, various reservation configurations (e.g., a service- or function-related reservation configuration), or a timer configuration. In addition, the time-linked information may include at least one of, for example, weather change information (e.g., a temperature over time, a change in precipitation, etc.), an estimated time of arrival (ETA) according to a departure time, ETA information, past stock information over time, preregistered schedule information, preregistered alarm information, information on various preregistered reservations (e.g., service or function execution-related reservation information), data or a resource required for a particular time point (e.g., purchase information, ticketing information, etc.).

Figure 1B:
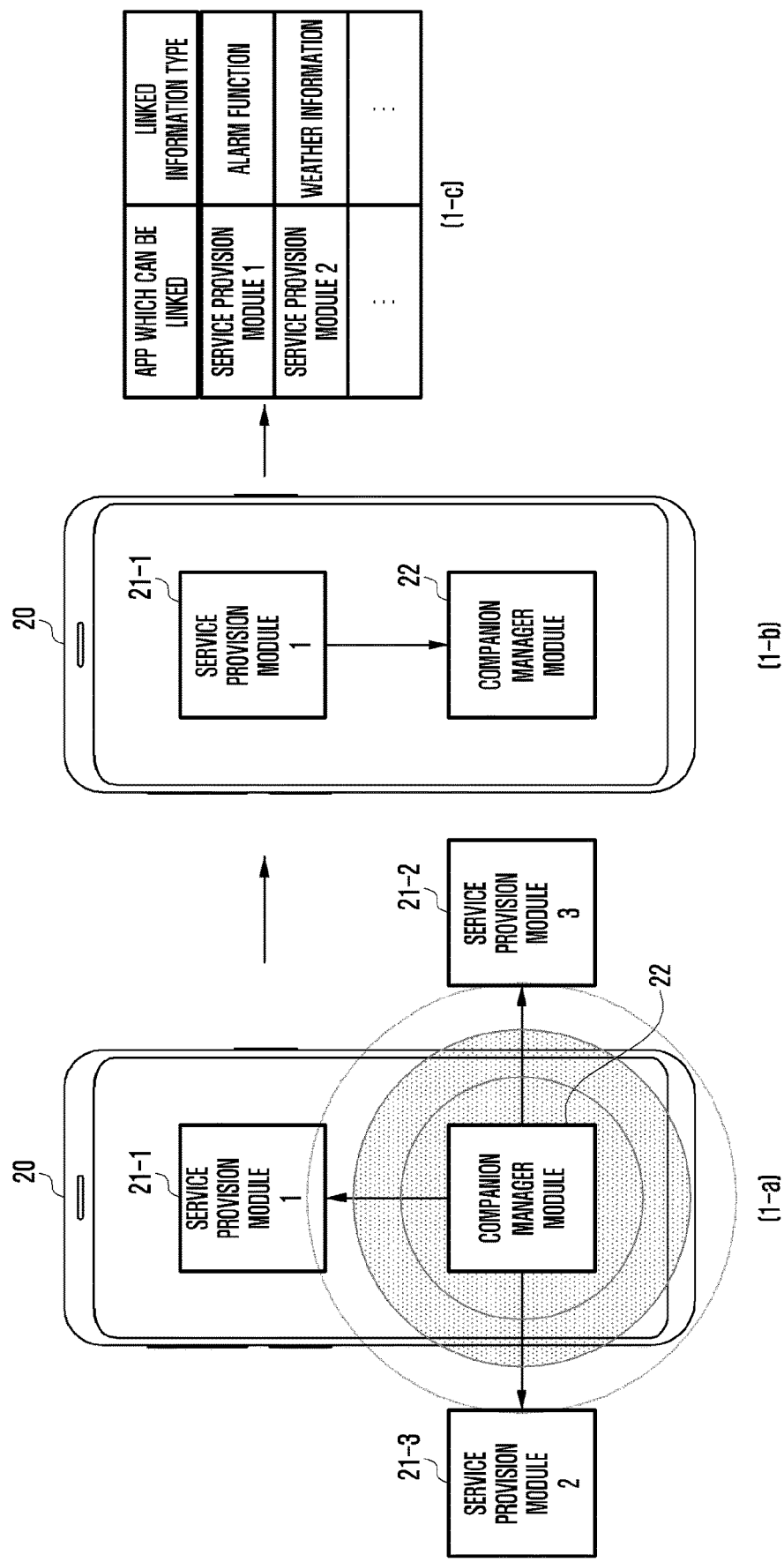
FIG. 1B illustrates a process of generating a list which can be linked to an electronic device according to an embodiment of the disclosure.

FIG. 1B illustrates a process of generating a list which can be linked to an electronic device according to an embodiment of the disclosure.

Referring to FIG. 1B, in part (1-*a*), the companion manager module 22 of the external device 20 may provide a message inquiring multiple service provision modules 21-1, 21-2, and 21-3 of whether multiple service provision modules 21-1, 21-2, and 21-3 can link to the electronic device 10. The multiple service provision modules 21-1, 21-2, and 21-3 may be positioned in the external device 20, or may be positioned in another external device (e.g., server) which can communicate with the external device 20.

For example, when there is a function, information, or a service of a service provision module 21-1, which can be linked to the electronic device 10, the service provision module 21-1 may provide the companion manager module 22 with a response message informing of the function, the information, or the service which can be linked to the electronic device 10 as shown in part (1-*b*) of FIG. 1B.

Referring to part (1-*c*) of FIG. 1B, the companion manager module 22 may configure a list including the function, the information, or the service which can be linked to the electronic device 10, by using response messages received from the multiple service provision modules 21-1, 21-2, and 21-3, respectively.

Figure 1C:
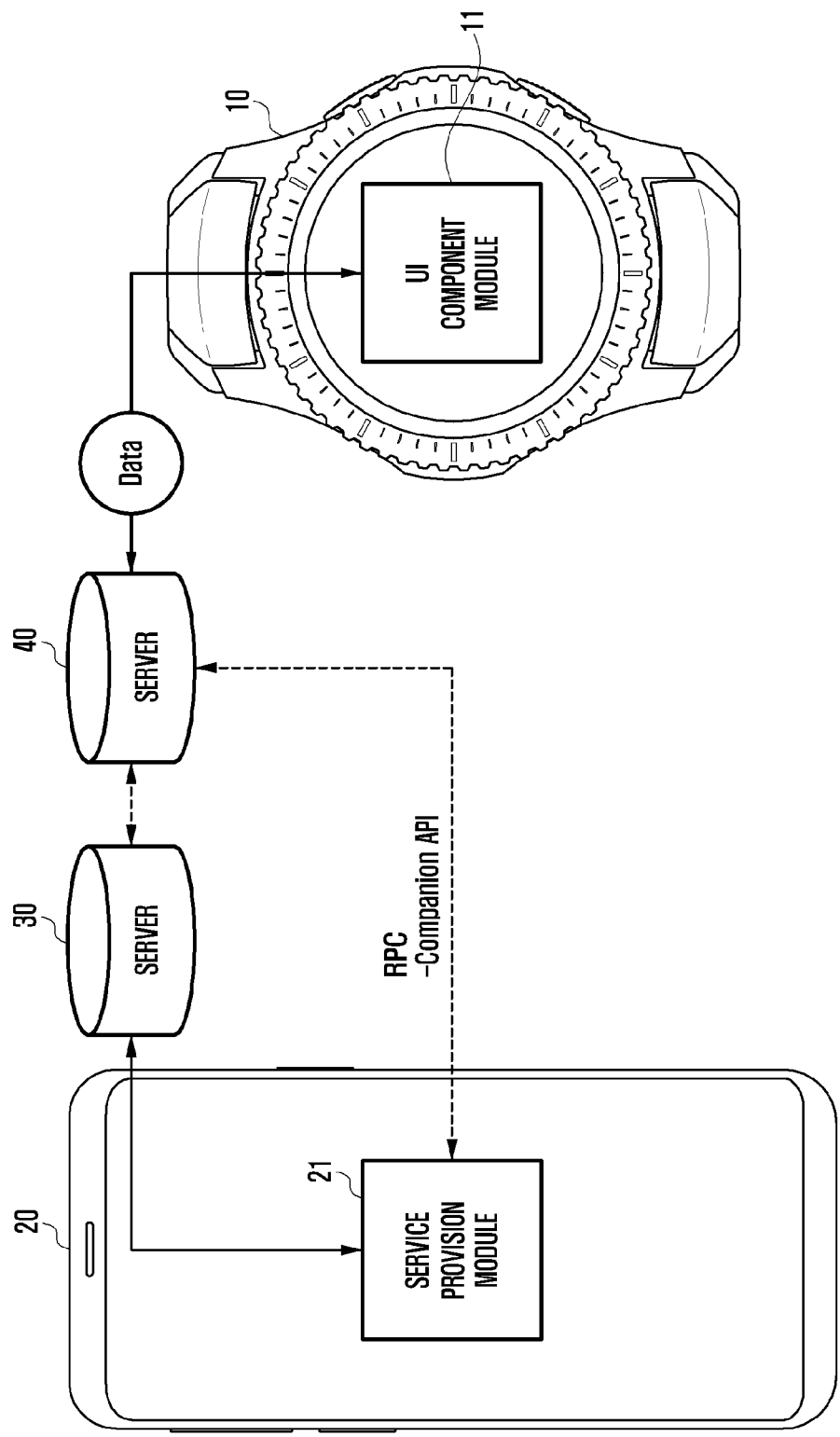
FIGS. 1C and 1D illustrate system diagrams including an electronic device and an external device according to various embodiments of the disclosure.

FIG. 1C is a system diagram including an electronic device and an external device according to another embodiment of the disclosure.

Referring to FIG. 1C, the service provision module 21 of the external device 20 may access a main server 40 of the electronic device 10 to transmit or receive data required to be linked to the electronic device 10. For example, the service provision module 21 may perform remote procedure call (RPC) communication with the main server 40 by using a predefined API.

The main server 40 of the electronic device 10 may transmit or receive data required to provide a particular function and/or service to or from the service provision module 21 of the external device 20. Alternatively, the main server 40 may also transmit or receive data required to provide a particular function and/or service to or from an external server 30 of the external device 20.

The main server 40 of the electronic device 10, which has acquired the data required to provide a particular function and/or service acquired from the external device 20 or the external server 30 of the external device 20, may transmit or receive various data (e.g., XML data) related to the data to or from a UI component module 11 of the electronic device 10. The data may include, for example, the time configuring function or the time-linked information described above in FIG. 1A.

Figure 1D:
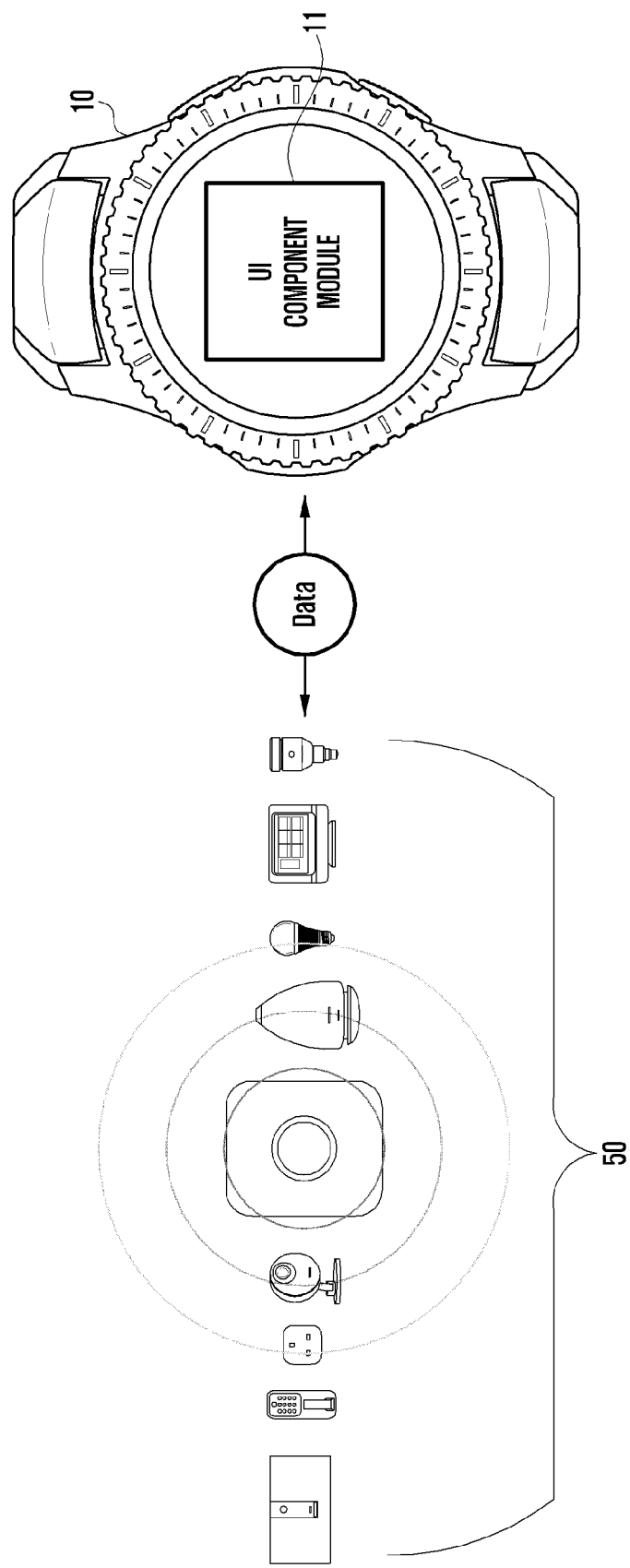

FIG. 1D is a system diagram including an electronic device and an external device according to another embodiment of the disclosure.

Referring to FIG. 1D, an external device 50 may be a sensing device which can detect at least one piece of information. The external device 50 may include, but is not limited to, at least one of, for example, a camera, a microphone, or an Internet of Things device (e.g., a light bulb, various sensors, a sprinkler device, a fire alarm, a temperature adjusting device, a street lamp, a toaster, exercise equipment, a hot water tank, a heater, a boiler, etc.).

The external device 50 may transmit or receive data required to be linked to the electronic device 10 while communicating with the electronic device 10. For example, the external device 50 and the electronic device 10 may interpret and transmit or receive data according to the standard communication profile (e.g., a GAAT profile of Bluetooth, etc.). Alternatively, the external device 50 and the electronic device 10 may transmit or receive data according to a stand-alone profile of the external device 50. In this case, the electronic device 10 may receive a parser which can interpret the stand-alone profile and interpret data acquired from the external device 50. Alternatively, when the manufacturers of the external device 50 and the electronic device 10 are the same or are related to each other, the external device 50 and the electronic device 10 may interpret and transmit or receive data according to a manufacturer's unique profile.

The data may include, for example, a time configuring function, time-linked information, or the like. The time configuring function may include at least one of, for example, various alarm configurations (e.g., a time configuration, a stock alarm configuration, etc.), a schedule configuration, various reservation configurations (e.g., a service- or function-related reservation configuration), or a timer configuration. The time-linked information may include, for example, data (e.g., a temperature, humidity, power consumption, and the like) acquired every particular time point or a particular period by a sensor provided in the external device 50.

Figure 2A:
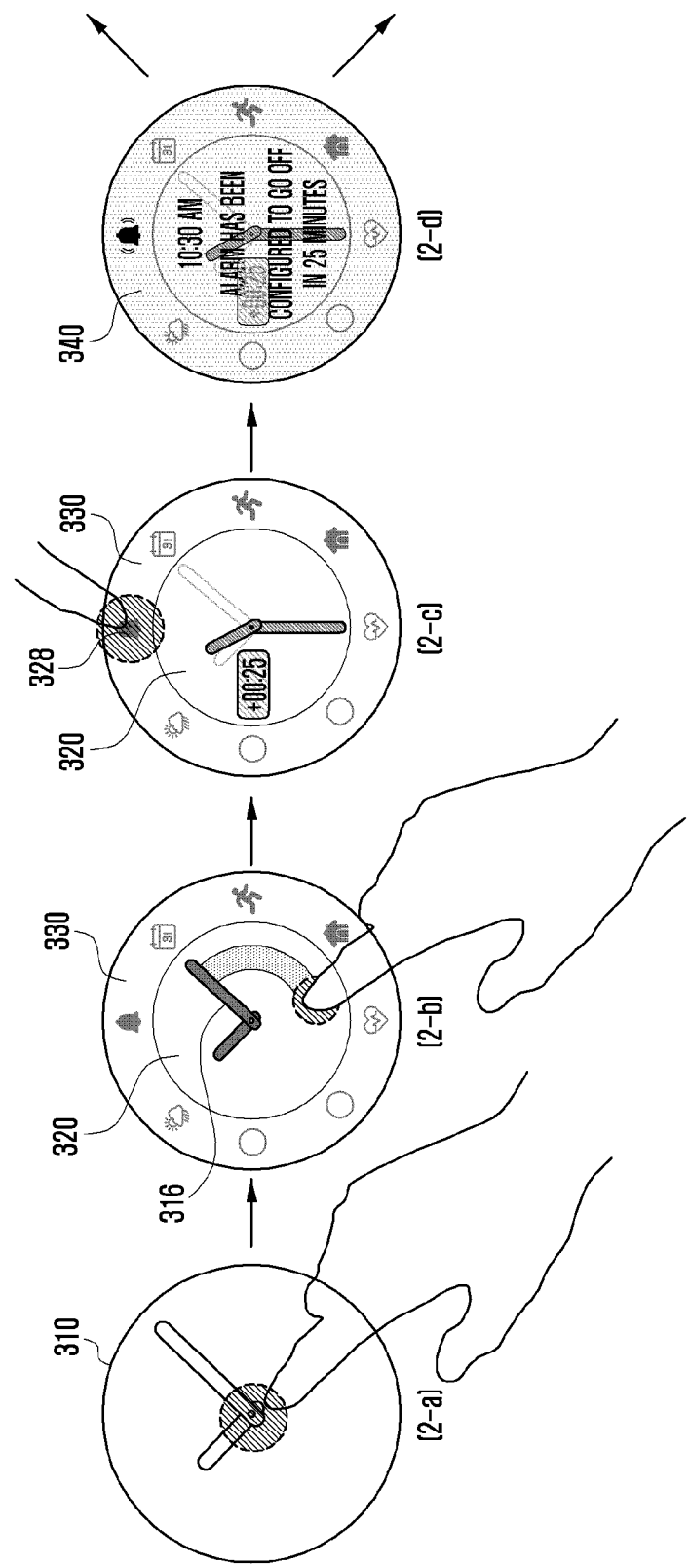
FIGS. 2A and 2B relate to a user interface for illustrating an operation of an electronic device according to various embodiments of the disclosure.
Figure 2B:
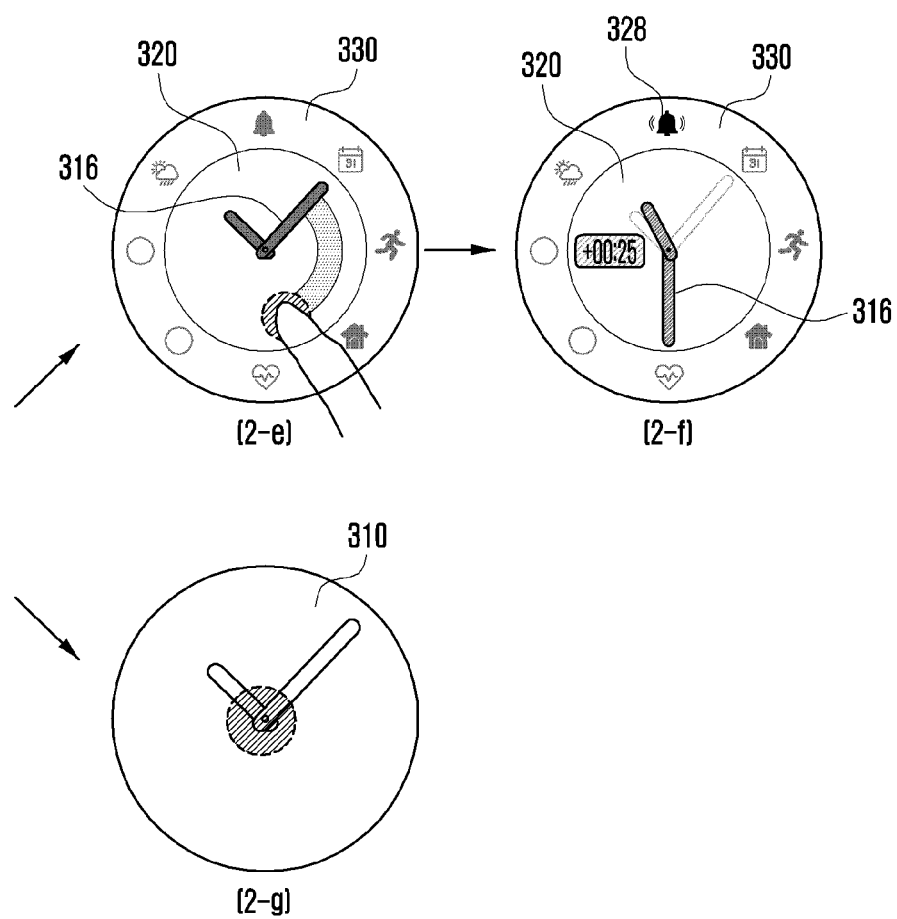

FIGS. 2A and 2B relate to a user interface for illustrating an operation of an electronic device according to various embodiments of the disclosure.

Referring to FIG. 2A, in part (2-*a*), the electronic device 10 may display a current watch UI 310 indicating current time. For example, when the electronic device 10 is turned on, or according to a user input, the electronic device 10 may execute an application related to a watch and may display the current watch UI 310 on an entire area (or a partial are) of a display as an execution screen of the application.

The electronic device 10 may acquire input data according to the user input for the display. When the display is laminated on a touch panel and is configured as a touchscreen, the user input may be, for example, a long press input on the touchscreen.

Referring to part (2-*b*) of FIG. 2A, the electronic device 10 may display a virtual watch UI 320 indicating a virtual time point according to the acquired input data. For example, the virtual watch UI 320 may configure an event element to be executed at a particular time point or may perform a navigating role which enables a search for a configured event element. The virtual watch UI 320 may include a virtual time object 316 (e.g., hands and a time picker) which enables time adjustment. The virtual time object may include, for example, an object indicating an hour hand and an object indicating a minute hand.

The virtual time point may be identical to the current time, or may start from a reference time point (e.g., 12:00, 24:00, and etc.). The electronic device 10 may display not only the virtual watch UI 320 but also an icon list UI 330 including multiple icons. The icon list UI 330 may be displayed on a display by surrounding the virtual watch UI 320. The multiple icons may be icons corresponding to event elements for which time configuration is available. For example, the multiple icons may correspond to multiple functions, respectively. The multiple functions may include, but are not limited to, at least one of a calendar function, an alarm function, a work-out reservation function, a device operation reservation function, a reminder function, a time reserved message/mail sending function, or a complication function, and the function and/or the service which can use time information may be applied to embodiments of the disclosure.

In this case, the electronic device 10 may acquire input data according to a user input of selecting one time point by using the virtual time UI 320. For example, the electronic device 10 may acquire input data according to a user input of dragging at least a part of the virtual time object 316. Specifically, the electronic device 10 may acquire input data according to a user input of dragging an hour hand object or a minute hand object included in the virtual watch UI 320 to indicate one time point.

In addition, referring to part (2-*c*) of FIG. 2A, the electronic device 10 may acquire input data according to a user input of selecting one icon 328 from the icon list UI 330.

In FIG. 2A, acquisition of input data according to the user input of selecting one time point precedes acquisition of input data according to the user input of selecting one icon 328, but according to another embodiment, acquisition of input data according to the user input of selecting one icon 328 may precede acquisition of input data according to the user input of selecting one time point.

When first input data according to a user input of selecting an icon 328 and second input data according to a user input of selecting one time point are acquired, the electronic device 10 may control a function corresponding to the icon 328 to be executed at the selected one time point, by using the first input data and the second input data. For example, when the function corresponding to the icon 328 is an alarm configuration function, the electronic device 10 may configure an alarm to be executed at the selected time point.

Next, referring to part (2-*d*) of FIG. 2A, the electronic device 10 may display a configuration identification screen 340 indicating that a function provision time point has been configured according to the selected one time point. For example, when an alarm provision time point is configured, the electronic device 10 may display a message such as "10:30 AM, an alarm has been configured to go off in 25 minutes" on the configuration identification screen 340.

Thereafter, when a predetermined time interval passes, or an additional user input is detected, the electronic device 10 may display the virtual watch UI 320 or the current watch UI 310.

For example, referring to (2-*e*) of FIG. 2B, the virtual watch UI 320 may be displayed. In this case, according to the user input, as shown in part (2-*f*) of FIG. 2B, when the virtual time point indicated by the virtual watch UI 320 reaches the one time point selected by the user in part (2-*c*) of FIG. 2A, the electronic device 10 may highlight the icon 328 corresponding to a function scheduled to be executed at the one time point. In the disclosure, the highlighting of the icon 328 may include having different colors, different frames, different shadow types, different brightness types, and different fonts from the other icons, or displaying, around the icon 328, an indicator for highlighting the icon 328. Alternatively, the highlighting of the icon 328 may include displaying the icon 328 only and not displaying the other icons. Alternatively, the highlighting of the icon 328 may include having different visual effects from the other icons. The different visual effects may include, for example, various animation or transition effects such as trembling or blinking which enables distinguishing of the icon 328 from the other icons.

In another example, referring to part (2-*g*) of FIG. 2B, the current watch UI 310 may be displayed. In this case, when the current time reaches the one time point selected by the user in part (2-*c*) of FIG. 2A, the electronic device 10 may execute a function corresponding to the icon 328. For example, the electronic device 10 may output an alarm at the one time point as a function corresponding to the icon 328.

In another embodiment, even though no current watch UI 310 is displayed, when the current time reaches the one time point selected by the user in part (2-*c*) of FIG. 2A, the electronic device 10 may execute the function corresponding to the icon 328.

FIGS. 2A and 2B illustrate that the icon list UI 330 is displayed by surrounding the virtual watch UI 320, but various types of virtual watch UI 320 and icon list UI 330 may be determined according the type of the display of the electronic device 10 or according to various embodiments of the disclosure. For example, when the display of the electronic device 10 has a square shape, each of the virtual watch UI 320 and the icon list UI 330 may be implemented in a square shape. In addition, the virtual watch UI 320 may be also implemented in a digital watch type as well as an analog watch type.

FIGS. 3A to 3F are detailed flow charts illustrating an operation of an electronic device according to various embodiments of the disclosure.

Figure 3A:
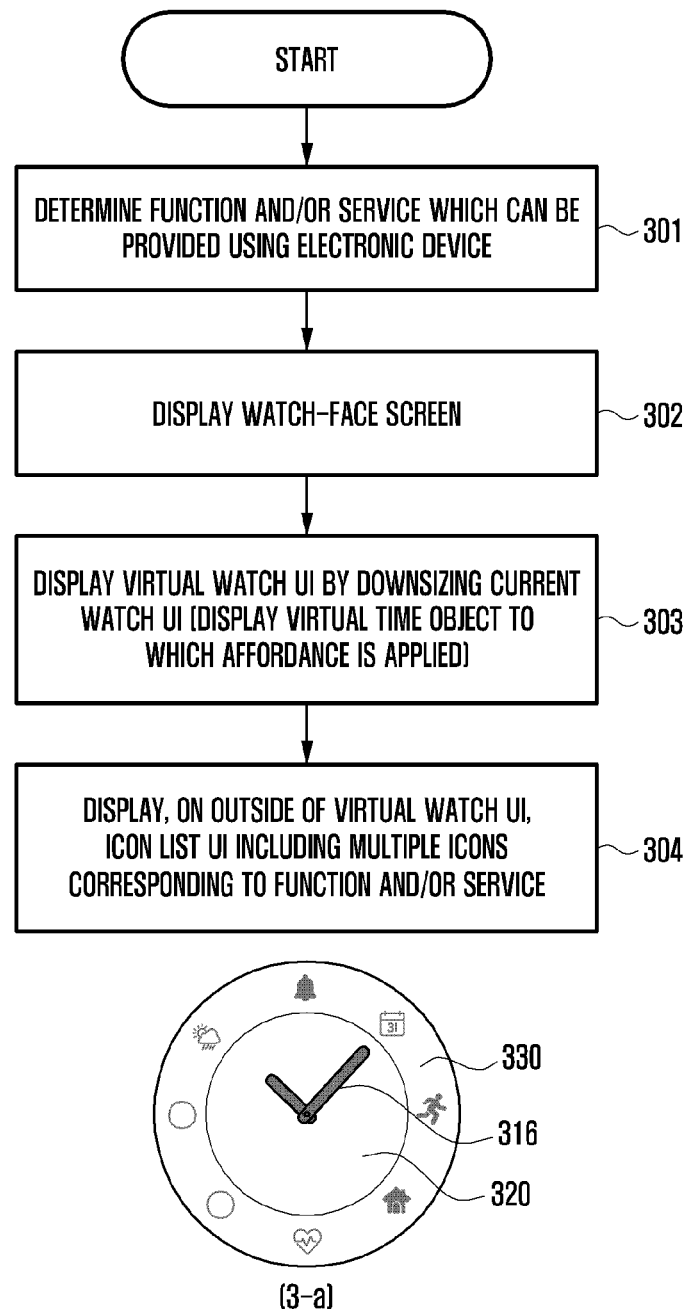
FIGS. 3A, 3B, 3C, 3D, 3E, and 3F are detailed flow charts illustrating an operation of an electronic device according to various embodiment of the disclosure.

Referring to FIG. 3A, a method of activation of a virtual time interface by the electronic device 10 is illustrated.

At operation 301, the electronic device 10 may determine a function and/or a service which can be provided using the electronic device 10.

For example, the electronic device 10 may collect information for a function and/or a service which can be provided by an application installed in the electronic device 10, information for a function and/or a service capable of being provided using an external device which can be linked to the electronic device 10, and the like.

At operation 302, the electronic device 10 may display a watch-face screen including a current watch UI.

At operation 303, when input data according to a user input of requesting to display a virtual watch UI is acquired, the electronic device 10 may downsize a current watch UI and display the virtual watch UI. In this case, a manipulable virtual time object (e.g., hands) may be generated and displayed on the virtual watch UI, and a virtual time object to which affordance is applied may be displayed, wherein the affordance indicates that the virtual time object is manipulable. For example, the virtual time object included in the virtual time UI may be displayed to have the shadow, the brightness, the size, and the color (e.g., point color) which are different from those of the current time object included in the current watch UI.

At operation 304, the electronic device 10 may display, on the outside of the virtual watch UI, an icon list UI including multiple icons corresponding to the function and/or the service determined in operation 301.

According to the above-described operations, the electronic device 10 may display a watch-face screen as shown in part (3-*a*) of FIG. 3A. Referring to part (3-*a*) of FIG. 3A, the watch-face screen may include a virtual watch UI 320 and an icon list UI 330.

Figure 3B:
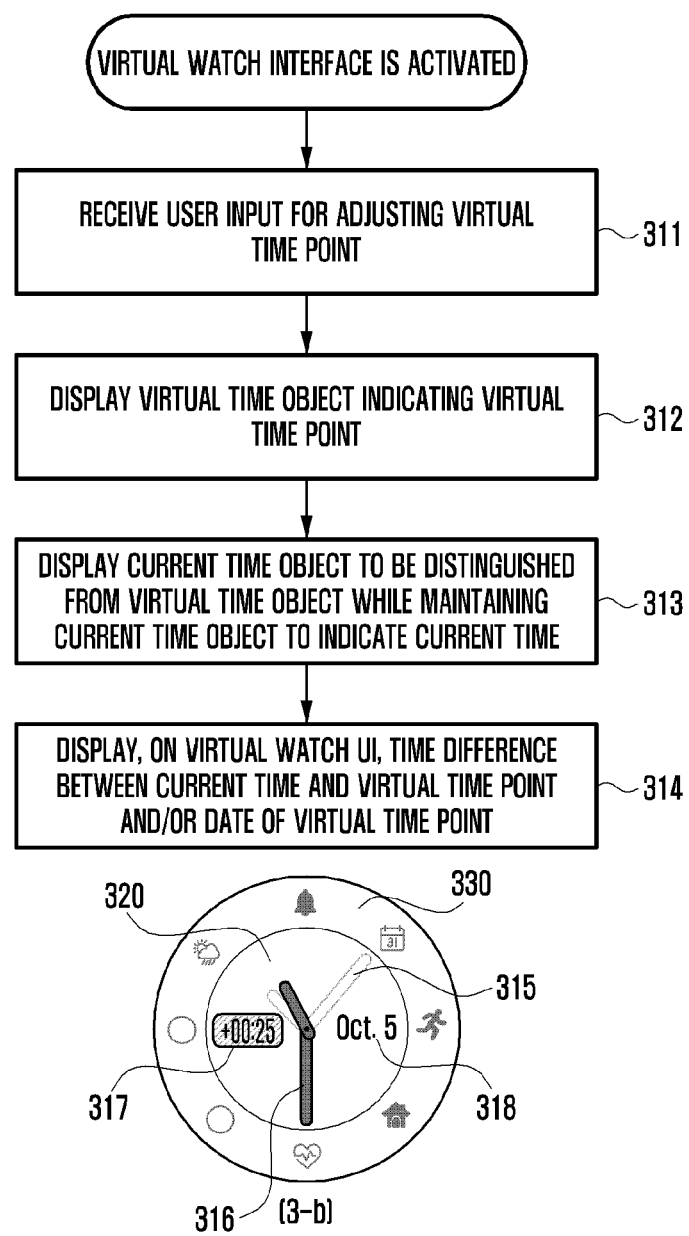

Referring to FIG. 3B, a method of adjustment of a virtual time point provided by the electronic device 10 is illustrated.

Referring back to part (3-*a*) of FIG. 3A, when a virtual watch interface is activated, the electronic device 10 may receive, in operation 311, a user input for adjusting a virtual time point. For example, while the virtual watch UI is being displayed, the electronic device 10 may receive input data according to a user input of rotating a bezel. Alternatively, while the virtual watch UI is being displayed, the electronic device 10 may receive input data according to a user input of dragging the virtual time object 316.

At operation 312, the electronic device 10 may display the virtual time object 316 indicating one virtual time point, so as to correspond to the rotation degree and the rotation direction of the bezel.

At operation 313, the electronic device 10 may also display a current time object 315 indicating current time, on the virtual watch UI 320. In this case, the electronic device 10 may display the current time object 315 to be distinguished from the virtual time object 316 while maintaining the current time object 315 to indicate the current time. For example, the electronic device 10 may process the current time object 315 to be dimmed and display the dimmed current time object 315, or may display the current time object 315 with the shadow, the brightness, the size, and the color different from those of virtual time object 316.

At operation 314, the electronic device 10 may display, on the virtual watch UI 320, a time difference between the current time and the one virtual time point and/or the date (e.g., a day of the week, a date, etc.) of the one virtual time point. For the date, one date in the present, the past, or the future may be displayed.

According to the above-described operations, the electronic device 10 may display a watch-face screen as shown in part (3-b) of FIG. 3B. Referring to part (3-b) of FIG. 3B, the watch-face screen may include a virtual watch UI 320 and an icon list UI 330. In addition, the watch-face screen may include the dimmed current time object 315, the virtual time object 316 changed to indicate one time point according a user input, a time different 317 between the current time and the changed virtual time point, and a date 318 of the changed virtual time point.

Figure 3C:
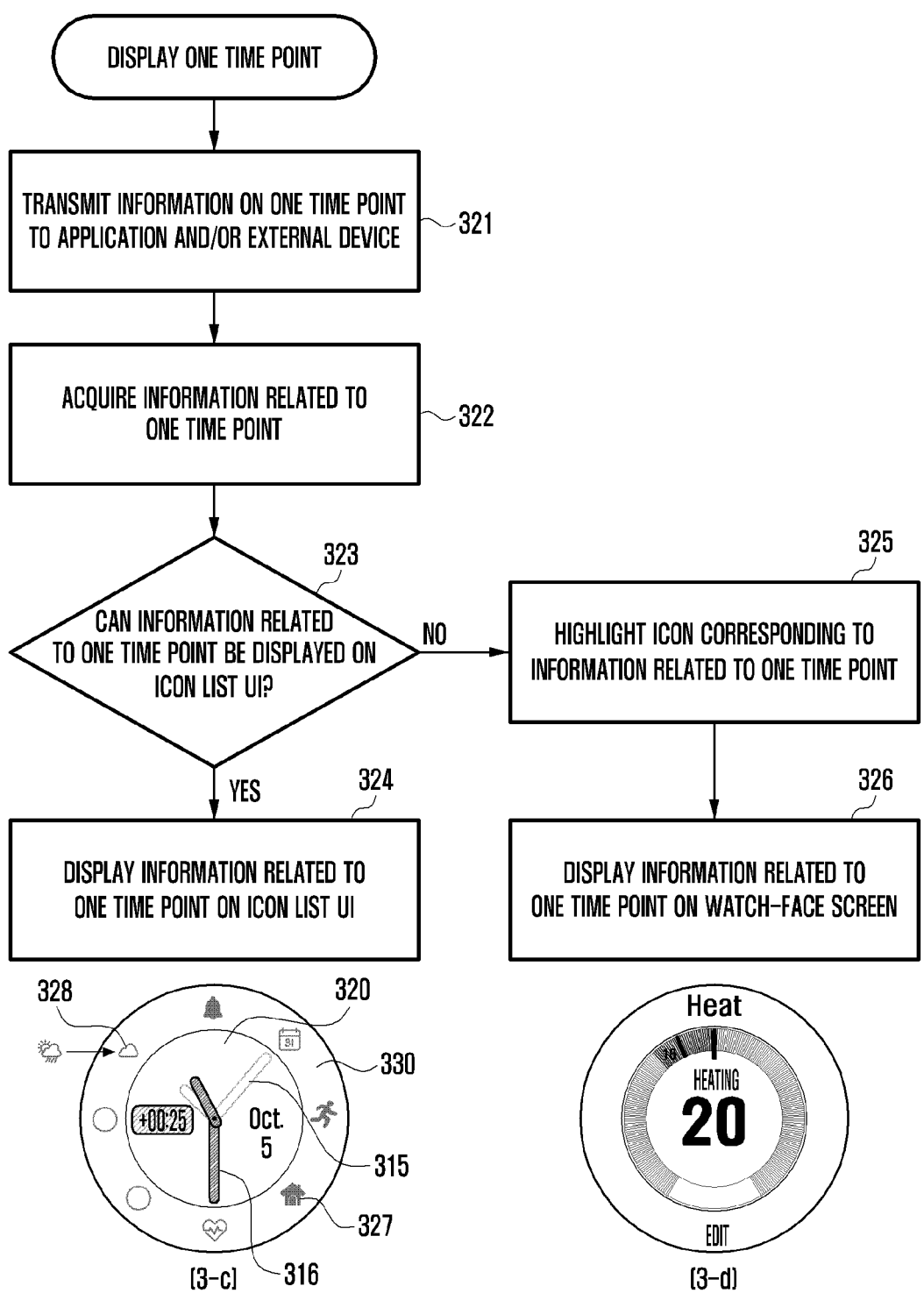

Referring to FIG. 3C, a method of displaying of information related to a virtual time point by the electronic device 10 is illustrated.

Referring to part (3-b) of FIG. 3B, when the virtual time interface indicates one time point, the electronic device 10 may transmit, in operation 321, information on the one time point to an application installed in the electronic device 10 and/or an external device which can be linked to the electronic device 10.

At operation 322, the electronic device 10 may acquire information related to the one time point from the application of the electronic device 10 or the external device.

At operation 323, the electronic device 10 may determine whether the acquired information related to the one time point can be displayed on the icon list UI 330.

When it is determined that the information can be displayed (if YES in operation 323), the electronic device 10 may display, in operation 324, the information related to the one time point on the icon list UI 330.

For example, the electronic device 10 may display a watch-face screen as shown in part (3-c) of FIG. 3C. Referring to part (3-c) of FIG. 3C, forecasted weather information (i.e., 328) of the selected virtual time point may be displayed on the icon list UI 330 of the watch-face, as the information related to the selected one time point. For example, the electronic device 10 may display information on the cloudy weather (i.e., icon 328) on the icon list UI 330, instead of the existing information on the rainy weather.

On the other hand, when it is determined that the information related to the one time point fails to be displayed (if NO in operation 323), the electronic device 10 may highlight, in operation 325, an icon corresponding to the information related to the selected one time point from the icon list UI 330.

When input data according to a user input of selecting the highlighted icon is acquired, the electronic device 10 may display, in operation 326, the information related to the one time point on the watch-face screen.

For example, the electronic device 10 may display the watch-face screen as shown in part (3-d) of FIG. 3C. Specifically, as a heat icon 327 is selected from the icon list UI 330 of part (3-c) of FIG. 3C, the electronic device 10 may display information including a temperature for sufficient heating of a home indoor space, as shown in part (3-d) of FIG. 3C.

Figure 3D:
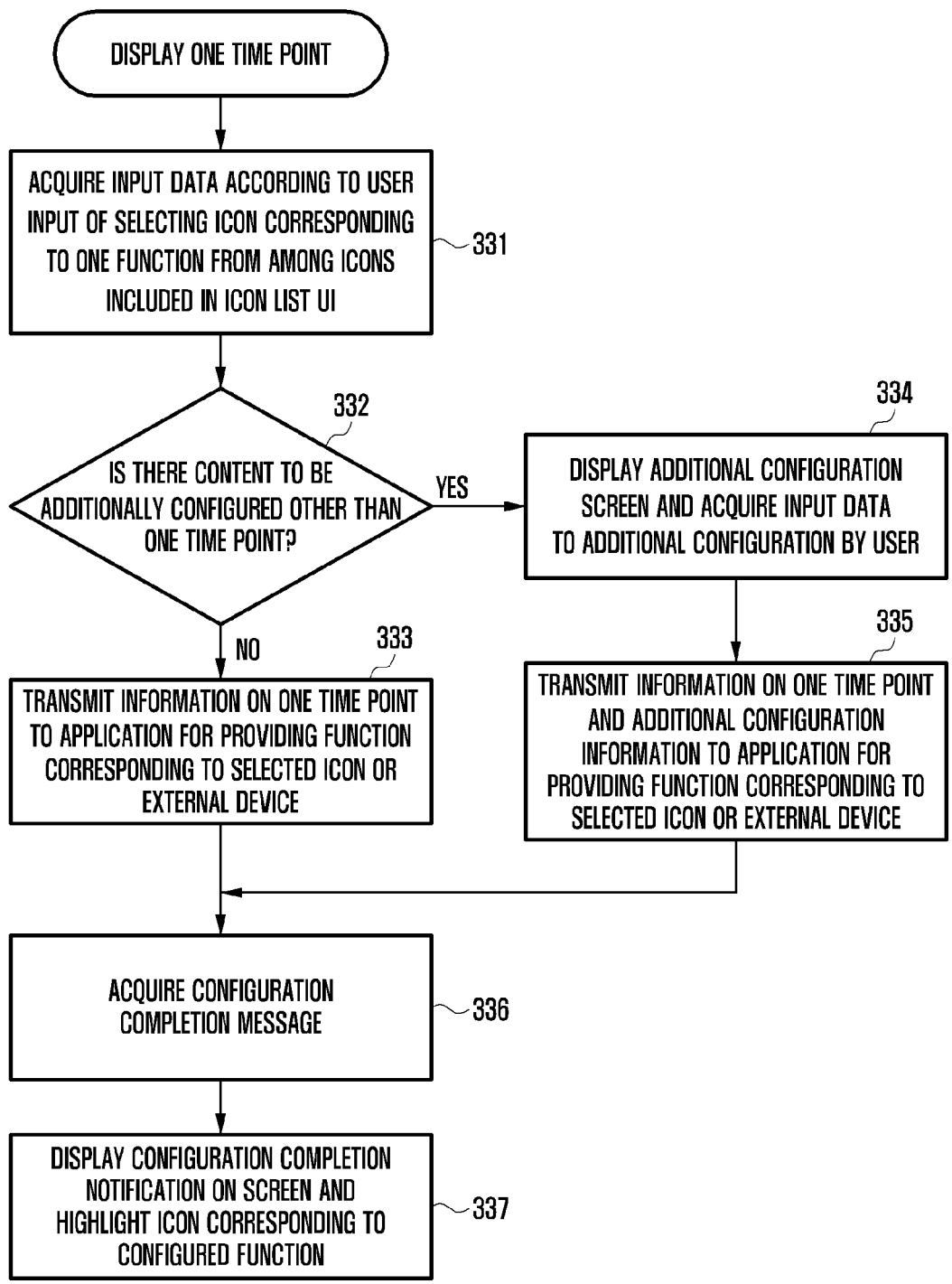

Referring to FIG. 3D, a method of a configuration of a function for a particular time point by the electronic device 10 is illustrated.

While the virtual time interface displays one time point as shown in part (3-b) of FIG. 3B, the electronic device 10 may acquire, in operation 331, input data according to a user input of selecting an icon corresponding to one function from among the icons included in the icon list UI 330.

At operation 332, the electronic device 10 may determine whether there is a content to be additionally configured other than one time point selected by the user.

When there is no content to be additionally configured (if NO in operation 332), the electronic device 10 may transmit, in operation 333, information related to the one time point to an application for providing a function corresponding to the selected icon or an external device including an application for providing the function.

When there is a content to be additionally configured (if YES in operation 332), the electronic device 10 may display, in operation 334, an additional configuration screen, and acquire input data according to the additional configuration by the user.

At operation 335, the electronic device 10 may transmit information related to the one time point and additional configuration information to an application for providing a function corresponding to the selected icon or an external device including an application for providing the function.

The application installed in the electronic device 10 or the external device may configure the function corresponding to the icon selected in operation 331 to be executed at the one time point, by using at least one of the received information related to the one time point or the received additional configuration information. In addition, the application installed in the electronic device 10 or the external device may further configure additional information based on the one time point and the function.

When the configuration is completed, the application installed in the electronic device 10 or the external device may provide a configuration completion message.

At operation 336, the electronic device 10 may acquire the configuration completion message.

At operation 337, the electronic device 10 may display a configuration completion notification indicating that the configuration has been completed, on a screen. In addition, in order to indicate that the configuration has been completed, the electronic device 10 may highlight the icon corresponding to the configured function.

Figure 3E:
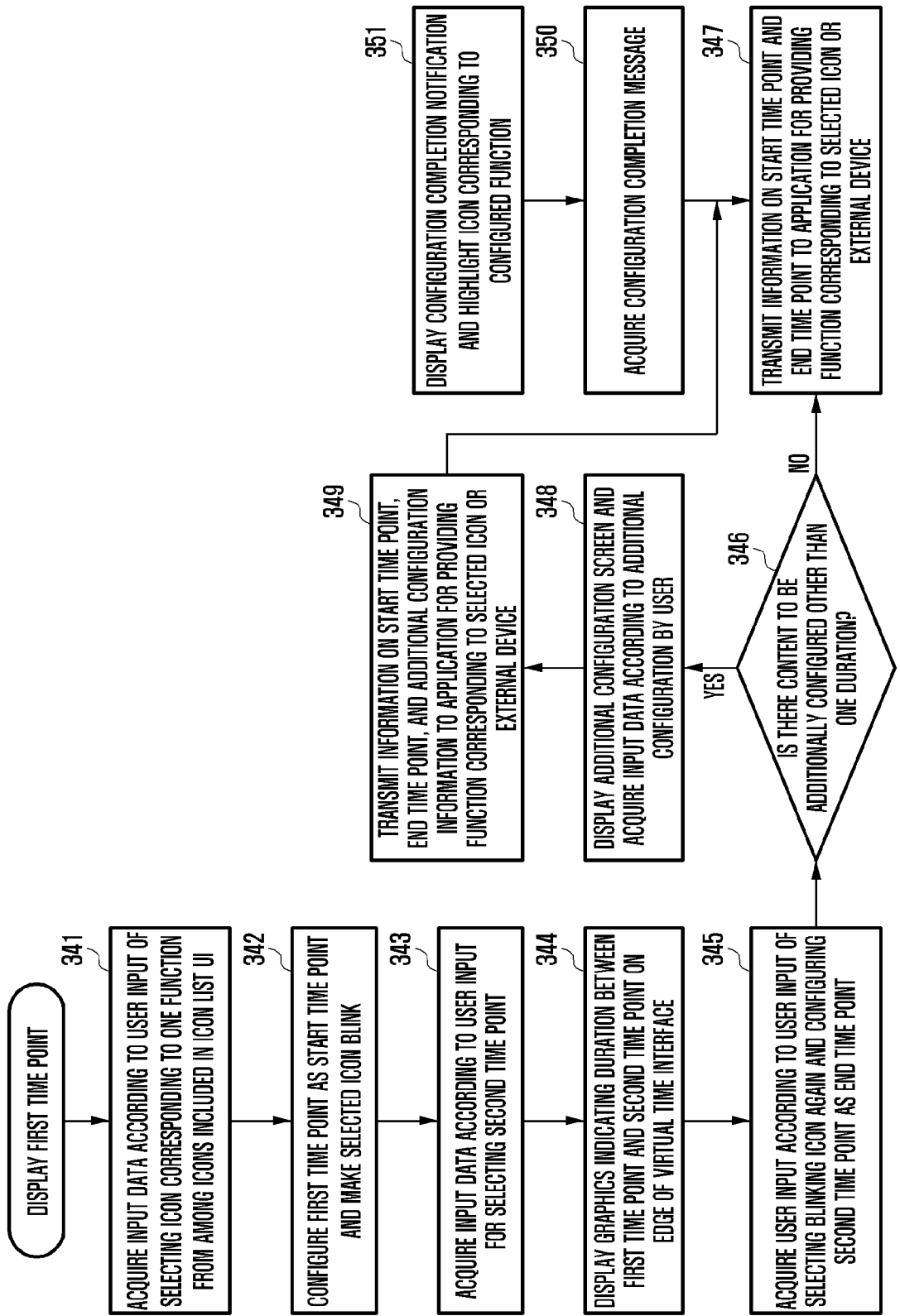

Referring to FIG. 3E, a method of a configuration of a function for predetermined duration by the electronic device 10 is illustrated.

Referring to part (3-b) of FIG. 3B, while the virtual time interface indicates a first time point, the electronic device 10 may acquire, in operation 341, input data according to a user input of selecting an icon corresponding to one function (e.g., a schedule function) from among icons included in the icon list UI 330.

In operation 342, the electronic device 10 may configure the first time point as a start time point and make the selected icon blink.

While the selected icon blinks, the electronic device 10 may acquire, in operation 343, input data according to a user input (e.g., a user input of rotating a bezel) for selecting a second time point.

At operation 344, the electronic device 10 may display graphics indicating the duration between the first time point and the second time point on the edge of the virtual time interface.

At operation 345, the electronic device 10 may acquire input data according to a user input of selecting the blinking icon again and configuring the second time point as an end time point.

At operation 346, the electronic device 10 may determine whether there is a content to be additionally configured other than one duration selected by the user.

When there is no content to be additionally configured (if NO in operation 346), the electronic device 10 may transmit, in operation 347, the start time point corresponding to the first time point and the end time point corresponding to the second time point to an application for providing a function corresponding to the selected icon or an external device including an application for providing the function.

When there is a content to be additionally configured (if YES in operation 346), the electronic device 10 may display, in operation 348, an additional configuration screen and acquire input data according to the additional configuration by the user.

At operation 349, the electronic device 10 may transmit the start time point corresponding to the first time point, the end time point corresponding to the second time point, and the additional configuration information to an application for providing a function corresponding to the selected icon or an external device including an application for providing the function.

At operation 341, the application installed in the electronic device 10 or the external device may configure the function corresponding to the selected icon to be executed according to the start time point and the end time point, by using at least one of the received start time point, end time point, or additional configuration information. In addition, the application installed in the electronic device 10 or the external device may further configure additional information based on the start time point, the end time point, and the function.

When the configuration is completed, the application installed in the electronic device 10 or the external device may provide a configuration completion message.

At operation 350, the electronic device 10 may acquire the configuration completion message.

At operation 351, the electronic device 10 may display a configuration completion notification indicating that the configuration has been completed, on a screen. In addition, in order to indicate that the configuration has been completed, the electronic device 10 may highlight an icon corresponding to the configured function.

Figure 3F:
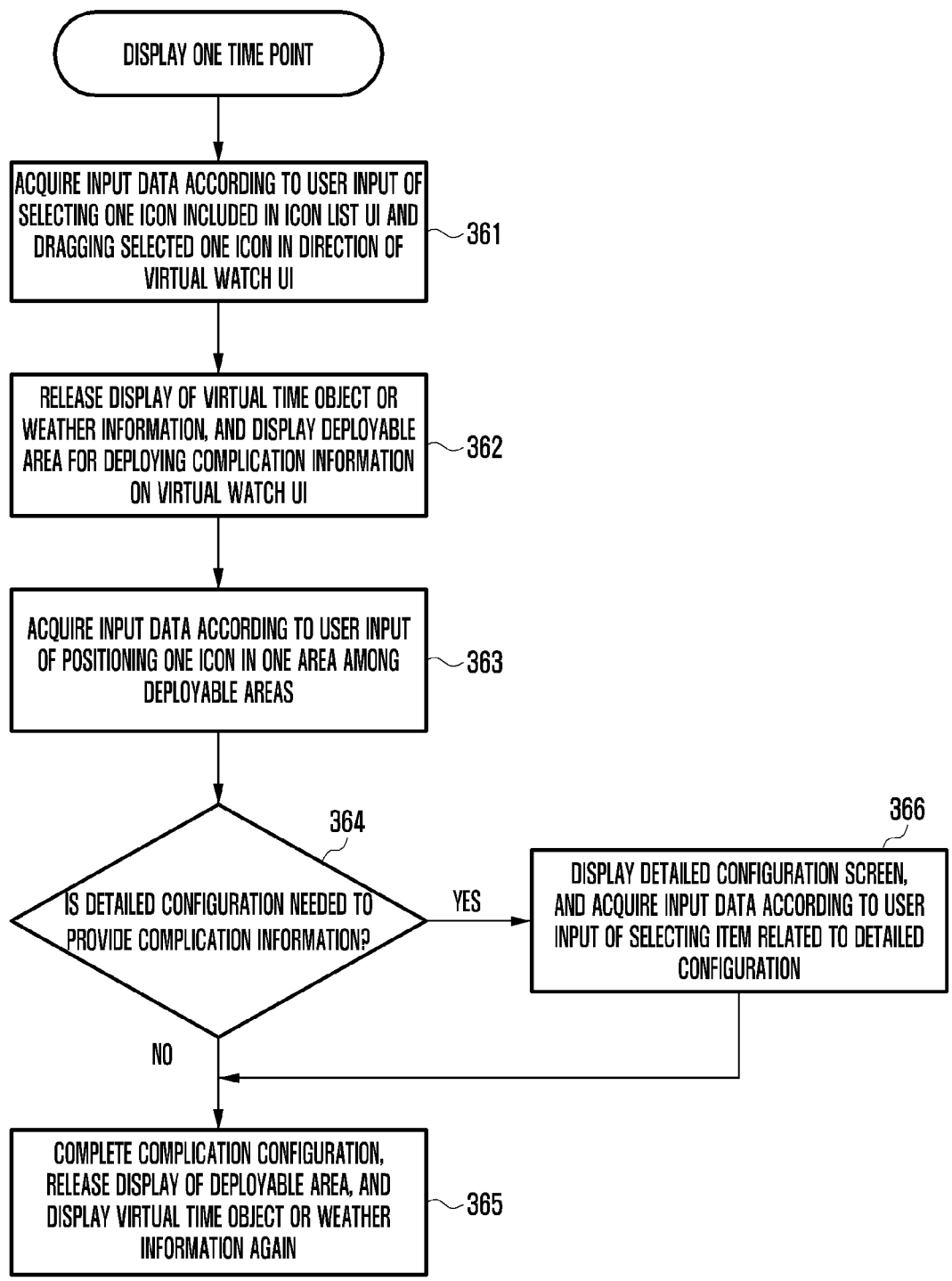

Referring to FIG. 3F, a method of a configuration of complication information with respect to a particular time point by the electronic device 10 is illustrated.

At operation 361, the electronic device 10 may acquire input data according to a user input of selecting one icon included in the icon list UI 330 and dragging the icon in the direction of the virtual watch UI 320.

At operation 362, the electronic device 10 may release the display of at least one of the weather information or the virtual time object 316 included in the virtual watch UI 320, or may process the same to be dimmed and display the same, and may display, on the virtual watch UI 320, at least one deployable area for deploying complication information provided by a function corresponding to an icon.

At operation 363, the electronic device 10 may acquire input data according to a user input of positioning the one icon selected in operation 361 in one area among the at least one deployable area.

In operation 364, the electronic device 10 may determine whether a detailed configuration is required to provide the complication information displayed on the one area.

When it is determined that no detailed configuration is required (if NO in operation 364), the electronic device 10 may complete, in operation 365, the complication configuration, release the display of the deployable area displayed on the virtual watch UI 320, and display the virtual time object 316 or the weather information again.

When it is determined that the detailed configuration is required (if YES in operation 364), the electronic device 10 may display, in operation 366, a detailed configuration screen, and acquire input data according to a user input of selecting an item related to the detailed configuration. Further, as shown in operation 365, the electronic device 10 may complete the complication configuration in consideration of the detailed configuration, release the display of the deployable area displayed on the virtual watch UI 320, and display the virtual time object 316 or the weather information again.

Figure 4:
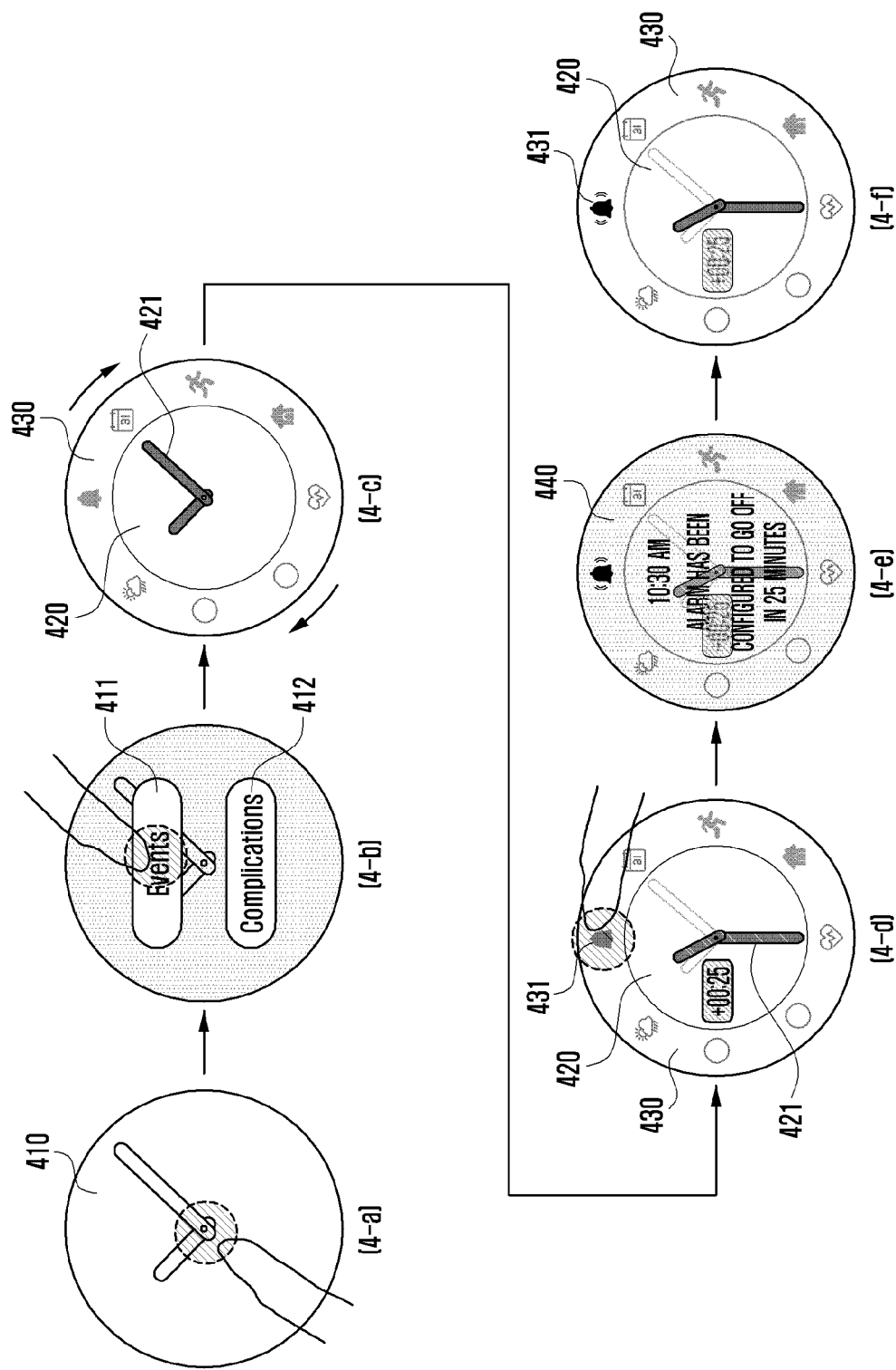
FIG. 4 illustrates user interfaces for configuring an alarm function according to an embodiment of the disclosure.

FIG. 4 illustrates user interfaces for configuring an alarm function according to an embodiment of the disclosure.

Referring to FIG. 4, in part (4-a), the electronic device 10 may display a current watch UI 410 indicating current time. While the current watch UI 410 is displayed, the electronic device 10 may acquire input data according to a user's touch on a display.

According to the input data, as shown in part (4-b) of FIG. 4, the electronic device 10 may display an event configuration button 411 and a complication configuration button 412. In this case, the electronic device 10 may acquire input data according to a user input of selecting the event configuration button 411.

According to the input data, as shown in part (4-c) of FIG. 4, the electronic device 10 may display an icon list UI 430 and a virtual watch UI 420 indicating a virtual time point. In this case, the electronic device 10 may acquire input data according a user input of rotating a bezel or dragging at least a part of a virtual time object 421 to select one time point.

According to the input data, as shown in part (4-d) of FIG. 4, while the virtual watch UI 420 indicates one time point, the electronic device 10 of FIG. 4 may acquire input data according to a user input of selecting an alarm icon 431 from the icon list UI 430. For example, the electronic device 10 may acquire input data according to the user's touch on the alarm icon 431.

According to the input data, as shown in part (4-e) of FIG. 4, the electronic device 10 may display an alarm configuration identification screen 440. The alarm configuration identification screen 440 displays "10:30 AM" as information relating to an alarm time point. In addition, the alarm configuration identification screen 440 may include a message such as "an alarm has been configured to go off in 25 minutes", as detailed information on the configured alarm.

In this case, when a predetermined time interval passes or a user input is detected, as shown in part (4-f) of FIG. 4, the electronic device 10 may display the virtual watch UI 420 and the icon list UI 430 again. Here, in order to indicate that an alarm is configured to be executed at one time point, the electronic device 10 may display the alarm icon 431 by highlighting the same.

Figure 5:
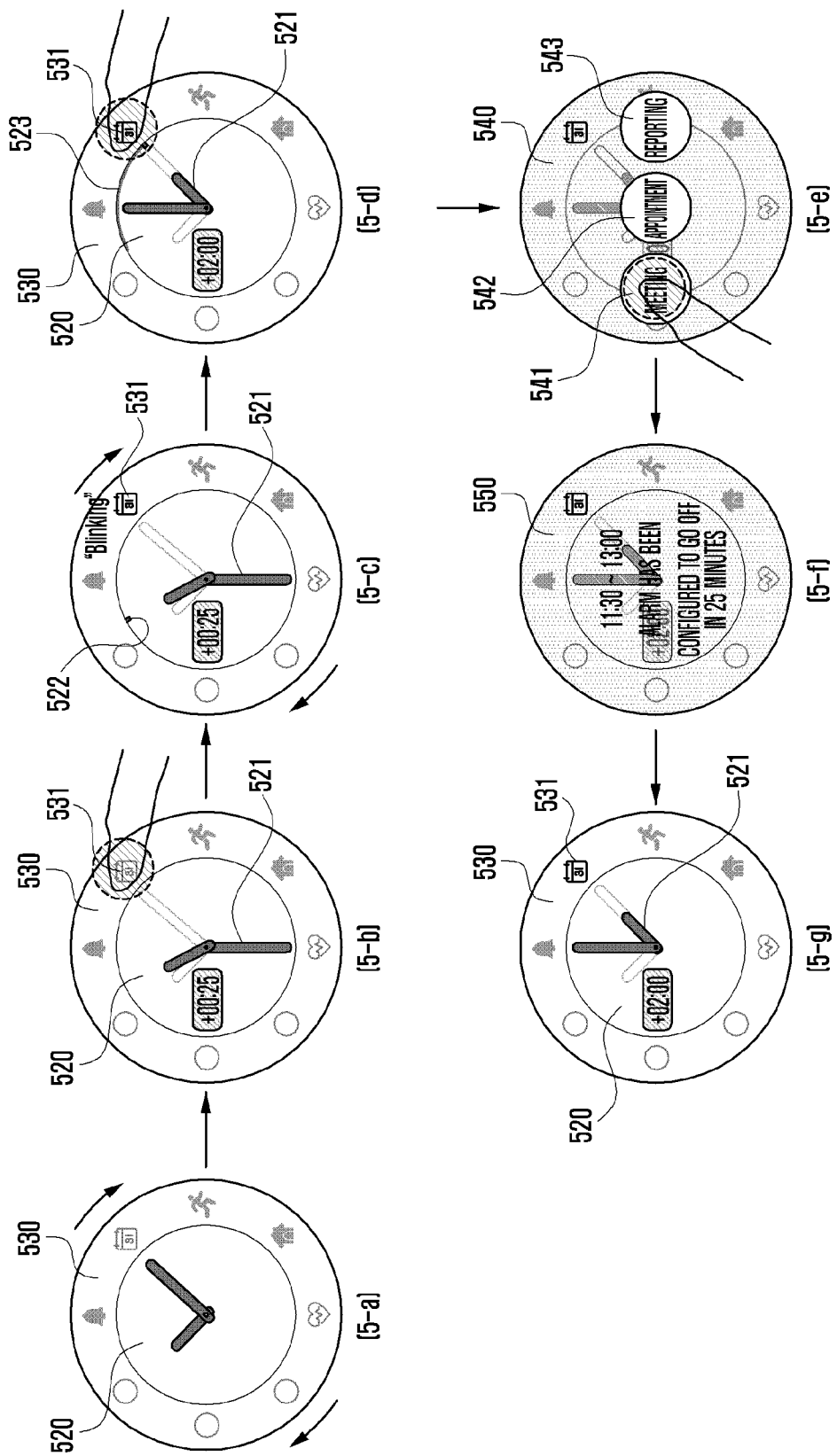
FIG. 5 illustrates user interfaces for registering a schedule according to an embodiment of the disclosure.

FIG. 5 illustrates user interfaces for registering a schedule according to an embodiment of the disclosure.

Referring to FIG. 5, in part (5-a), the electronic device 10 may display a virtual watch UI 520 and an icon list UI 530. In this case, the electronic device 10 may acquire input data according to a user input of rotating a bezel a first time point or dragging at least a part of a virtual time object 521 to select one time point.

According to the input data, as shown in part (5-b) of FIG. 5, while the virtual watch UI 520 indicates the first time point, the electronic device 10 may acquire input data according a user input of selecting a schedule icon 531 from an icon list UI 530. For example, the electronic device 10 may acquire input data according to a user's touch on the schedule icon 531.

According to the input data, as shown in part (5-c) of FIG. 5, the electronic device 10 may highlight the schedule icon 531. For example, the electronic device 10 may make the schedule icon 531 blink. In addition, the electronic device 10 may display an indicator 522 indicating a schedule start time point corresponding to the first time point.

While the schedule icon blinks, the electronic device 10 may configure duration. For example, the electronic device 10 may acquire input data according to a user input of rotating a bezel or dragging at least a part of the virtual time object 521 to select a second time point.

According to the input data, as shown in part (5-d) of FIG. 5, while the electronic device 10 indicates the second time point, the electronic device 10 of FIG. 5 may acquire input data according to a user input of selecting the schedule icon 531 again from the icon list UI 530. For example, the electronic device 10 may acquire input data according to the user's touch on the schedule icon 531. In this case, the electronic device 10 may display a duration indicator 523 which indicates the duration between the first time point and the second time point (i.e., the length in time from the start time point of an event to a configured time point).

According to the input data, as shown in part (5-e) of FIG. 5, the electronic device 10 may display a detailed configuration screen 540 for configuring a detailed function related to a function corresponding to the schedule icon 531. The detailed configuration screen 540 may display, for example, buttons 541, 542, and 543 enabling to select a schedule type (e.g., a meeting, an appointment, and a report). In this case, the electronic device 10 may acquire input data according to a user input of selecting one type of button 541. For example, the electronic device 10 may acquire input data according to a user touch on the button 541.

According to the input data, as shown in part (5-f) of FIG. 5, the electronic device 10 may display a schedule configuration identification screen 550. As information relating to configured predetermined duration, "11:30-13:00" may be displayed on the schedule configuration identification screen 550. In addition, as detailed information relating to the configured schedule, a message such as "a meeting schedule has been registered in 25 minutes" may be displayed.

In this case, when a predetermined time interval passes or a user input is detected, as shown in part (5-g) of FIG. 5, the electronic device 10 may display the virtual watch UI 520 and the icon list UI 530 again. Here, in order to indicate that a schedule is configured for the duration, the electronic device 10 may display the schedule icon 531 by highlighting the same.

Figure 6:
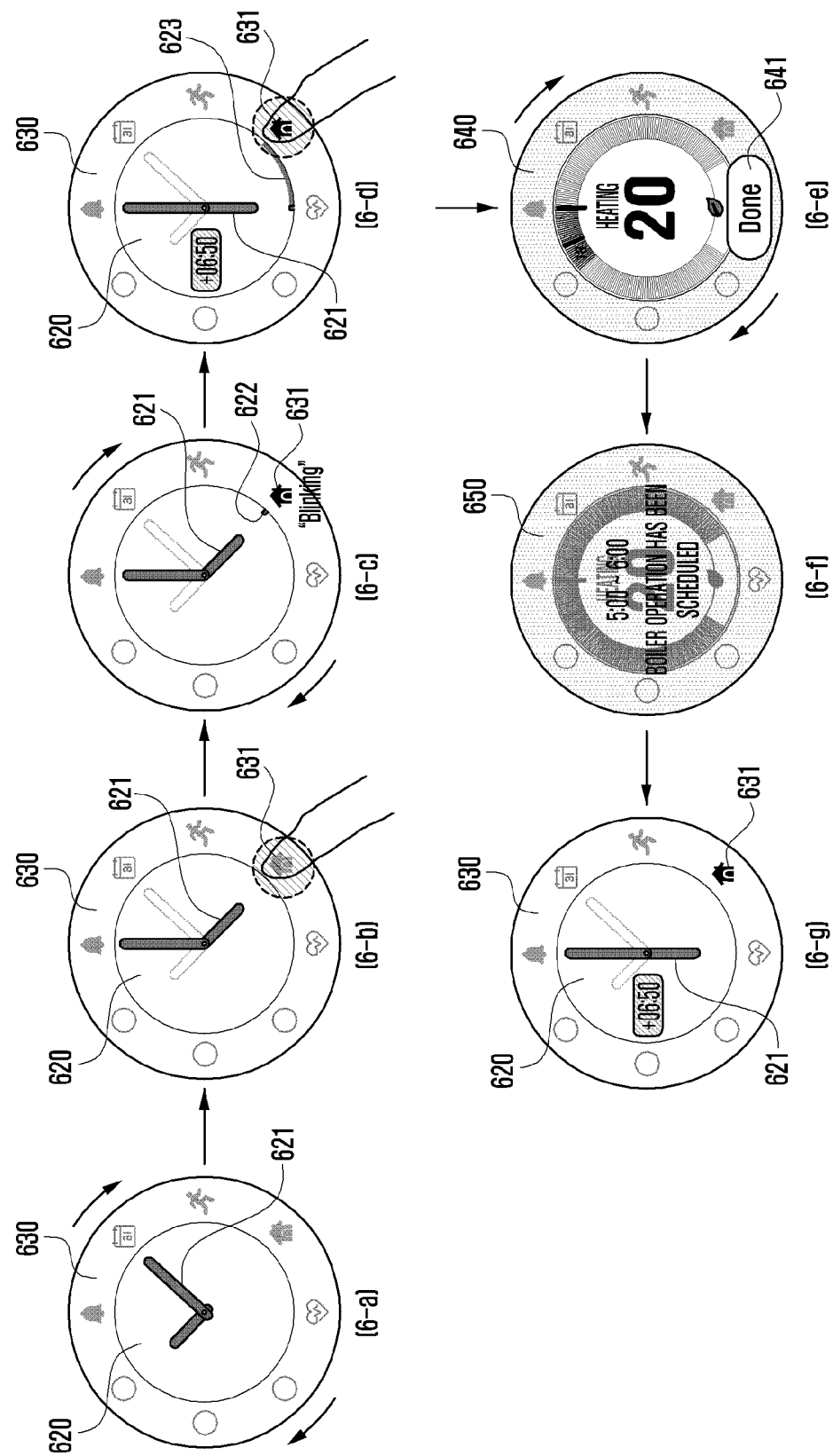
FIG. 6 illustrates user interfaces for registering a heating schedule of a third device according to an embodiment of the disclosure.

FIG. 6 illustrates user interfaces for registering a heating schedule of a third device according to an embodiment of the disclosure.

For example, the electronic device 10 may schedule an operation of a boiler at home according to an embodiment of the disclosure.

Referring to FIG. 6, in part (6-a), the electronic device 10 may display a virtual watch UI 620 and an icon list UI 630. In this case, the electronic device 10 may acquire input data according to a user input of rotating a bezel or dragging at least a part of a virtual time object 621 to select a first time point.

According to the input data, as shown in part (6-b) of FIG. 6, while the virtual watch UI 620 indicates the first time point, the electronic device 10 of FIG. 6 may acquire input data according to a user input of selecting a heat (or heating) icon 631 from the icon list UI 630. For example, the electronic device 10 may acquire input data according to a user's touch on the heat icon 631.

According to the input data, as shown in part (6-c) of FIG. 6, the electronic device 10 may highlight the heat icon 631. For example, the electronic device 10 may make the heat icon 631 blink. In addition, the electronic device 10 may display an indicator 622 indicating a start time point of a schedule, which corresponds to the first time point.

While the heat icon blinks, the electronic device 10 may configure duration. For example, the electronic device 10 may acquire input data according to a user input of rotating a bezel or dragging at least a part of the virtual time object 621 to select a second time point.

According to the input data, as shown in part (6-d) of FIG. 6, while the electronic device 10 indicates the second time point, the electronic device 10 of FIG. 6 may acquire input data according to a user input of selecting the heat icon 631 again from the icon list UI 630. For example, the electronic device 10 may acquire input data according to a user's touch on the heat icon 631. In this case, the electronic device 10 may display a duration indicator 623 indicating the duration between the first time point and the second time point (i.e., the length in time from a start time point of an event to a configured time point).

According to the input data, as shown in part (6-e) of FIG. 6, the electronic device 10 may display a detailed configuration screen 640 for configuring a detailed function related to a function corresponding to the heat icon 631. The detailed configuration screen 640 may be, for example, a screen for adjusting a heating temperature. In this case, the electronic device 10 may acquire input data according to a user input of rotating a bezel for selecting a heating temperature, and selecting a temperature selection completion button 641.

When the input data is acquired, the electronic device 10 may transmit information on the first time point, the second time point, and the selected heating temperature to an external device (e.g., an external device at home) which can control a boiler.

When it is scheduled for the external device to operate the boiler at the heating temperature for the duration between the first time point and the second time point, the external device may transmit a configuration completion message to the electronic device 10.

Referring to part (6-f) of FIG. 6, the electronic device 10 having received the configuration completion message may display a schedule configuration identification screen 650. The schedule configuration identification screen 650 may include a message such as "5:00-6:00, the boiler operation has been scheduled."

In this case, when a predetermined time interval passes or a user input is detected, as shown in part (6-g) of FIG. 6, the electronic device 10 may display the virtual watch UI 620 and the icon list UI 630 again. Here, in order to indicate that a boiler operation schedule is configured, the electronic device 10 may display the heat icon 631 by highlighting the same.

Figure 7:
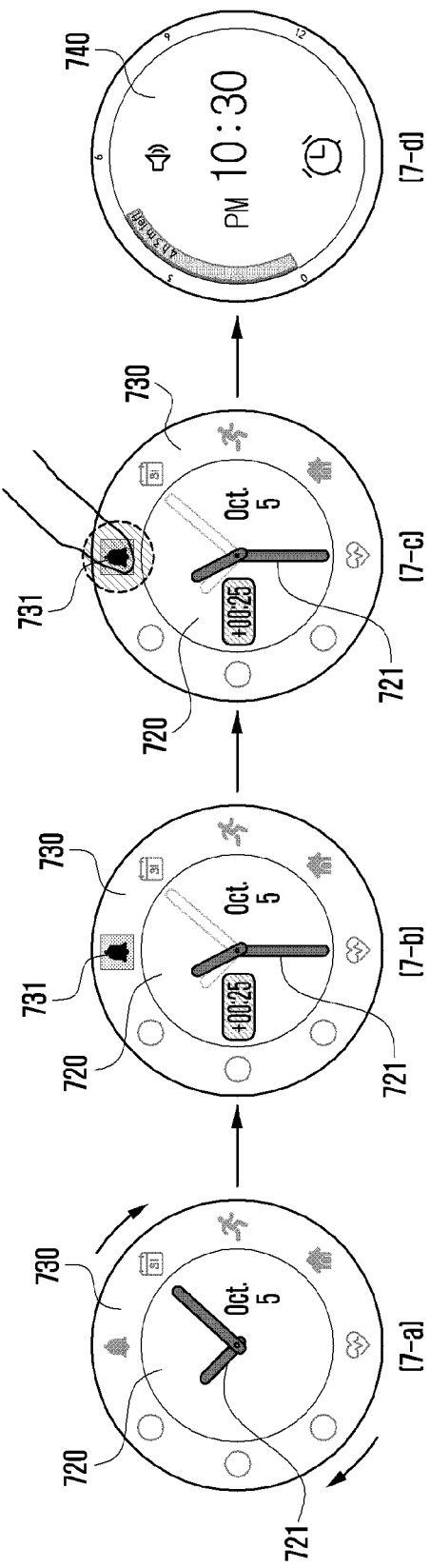
FIG. 7 illustrates user interfaces for identifying a configured alarm according to an embodiment of the disclosure.

FIG. 7 illustrates user interfaces for identifying a configured alarm according to an embodiment of the disclosure.

Referring to FIG. 7, the electronic device 10 may be in a state in which an alarm function is configured according to the embodiment described in FIG. 4 above.

In part (7-a) of FIG. 7, the electronic device 10 may display a virtual watch UI 720 and an icon list UI 730. In this case, the electronic device 10 may acquire input data according to a user input of rotating a bezel, or dragging at least a part of a virtual time object 721.

According to the input data, while the virtual time object 721 rotates, the electronic device 10 may determine whether there is a function configured to be executed at a time point indicated by the virtual time object 721. For example, in a situation in which an alarm function is configured at one time point, when a virtual time point indicated by the virtual time object 721 reaches the one time point, the electronic device 10 may display an alarm icon 731 corresponding to the configured function by highlighting the same as shown in part (7-b) of FIG. 7.

When the input data according to a user input of selecting the highlighted alarm icon 731 is received in part (7-c) of FIG. 7, the electronic device 10 may display a detailed alarm identification screen 740 as shown in part (7-d) of FIG. 7. The detailed alarm identification screen 740 may include at least one of an alarm time point, a time left until the alarm time point, or information on the volume of an alarm sound.

Figure 8:
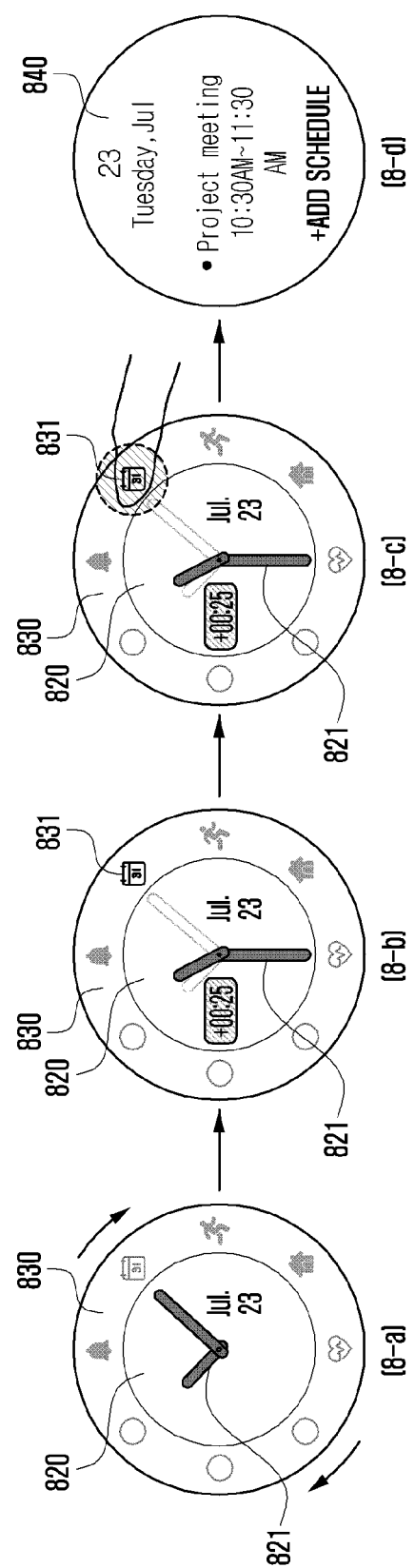
FIG. 8 illustrates user interfaces for identifying a configured schedule according to an embodiment of the disclosure.

FIG. 8 illustrates user interfaces for identifying a configured schedule according to an embodiment of the disclosure.

Referring to FIG. 8, the electronic device 10 may be in a state in which the schedule registration function is configured according to the embodiment described in FIG. 5 above.

In part (8-a) of FIG. 8, the electronic device 10 may display a virtual watch UI 820 and an icon list UI 830. In this case, the electronic device 10 may acquire input data according to a user input of rotating a bezel, or dragging at least a part of a virtual time object 821.

According to the input data, while the virtual time object 821 rotates, the electronic device 10 may determine whether there is a function configured at a time point indicated by the virtual time object 821. For example, in a situation in which a schedule function is configured for particular duration, when a virtual time point indicated by the virtual time object 821 reaches one time point in the particular duration, the electronic device 10 may display the schedule icon 831 corresponding to the configured function by highlighting the same, as shown in part (8-b) of FIG. 8.

When the input data according to a user input of selecting the highlighted schedule icon 831 is received in part (8-c) of FIG. 8, the electronic device 10 may display a detailed schedule identification screen 840 as shown in part (8-d) of FIG. 8. The detailed schedule identification screen 840 may include at least one of schedule duration, a schedule date, a schedule type, or a schedule addition UI.

Figure 9:
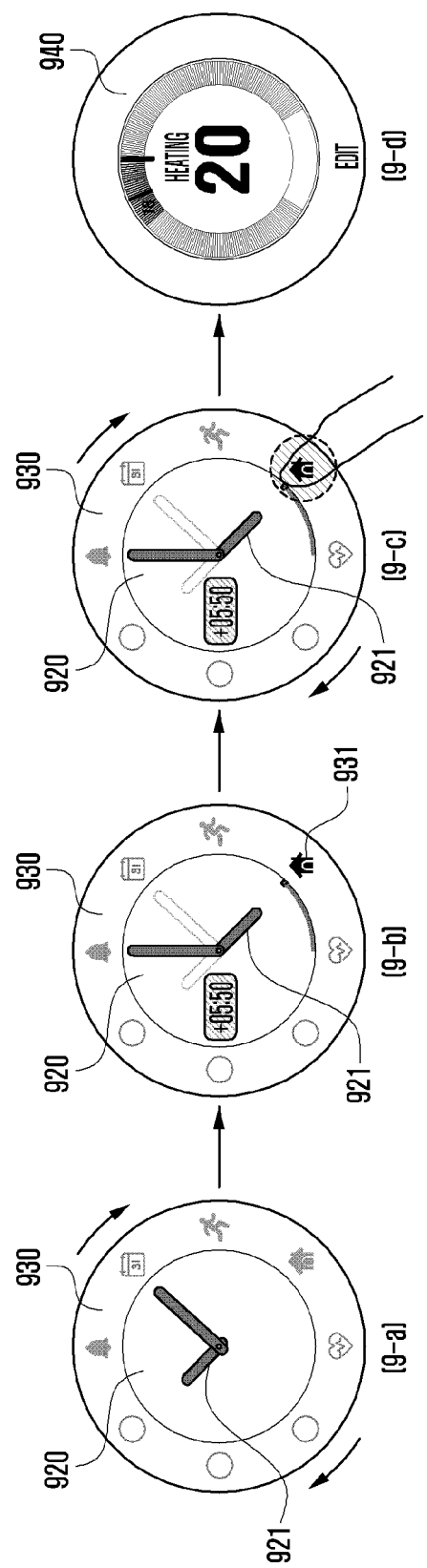
FIG. 9 illustrates user interfaces for identifying a configured heating schedule of a third device configured according to an embodiment of the disclosure.

FIG. 9 illustrates user interfaces for identifying a configured heating schedule of a third device configured according to an embodiment of the disclosure.

Referring to FIG. 9, the electronic device 10 may be in a state in which the operation of a boiler at home is scheduled according to the embodiment described in FIG. 6 above.

In part (9-a) of FIG. 9, the electronic device 10 may display a virtual watch UI 920 and an icon list UI 930. In this case, the electronic device 10 may acquire input data according to a user input of rotating a bezel, or dragging at least a part of a virtual time object 921.

According to the input data, while the virtual time object 921 rotates, the electronic device 10 may determine whether there is a function configured at a time point indicated by the virtual time object 921. For example, in a situation in which a heating function is configured for particular duration, when a virtual time point indicated by the virtual time object 921 reaches one time point in the particular duration, the electronic device 10 may display a heat icon 931 corresponding to the configured function by highlighting the same, as shown in part (9-b) of FIG. 9.

When the input data according to a user input of selecting the highlighted heat icon 931 is received in part (9-c) of FIG. 9, the electronic device 10 may display a reservation identification screen 940 as shown in part (9-d) of FIG. 9. The reservation identification screen 940 may include at least one of a heating temperature, heating duration, or a heating area.

Figure 10:
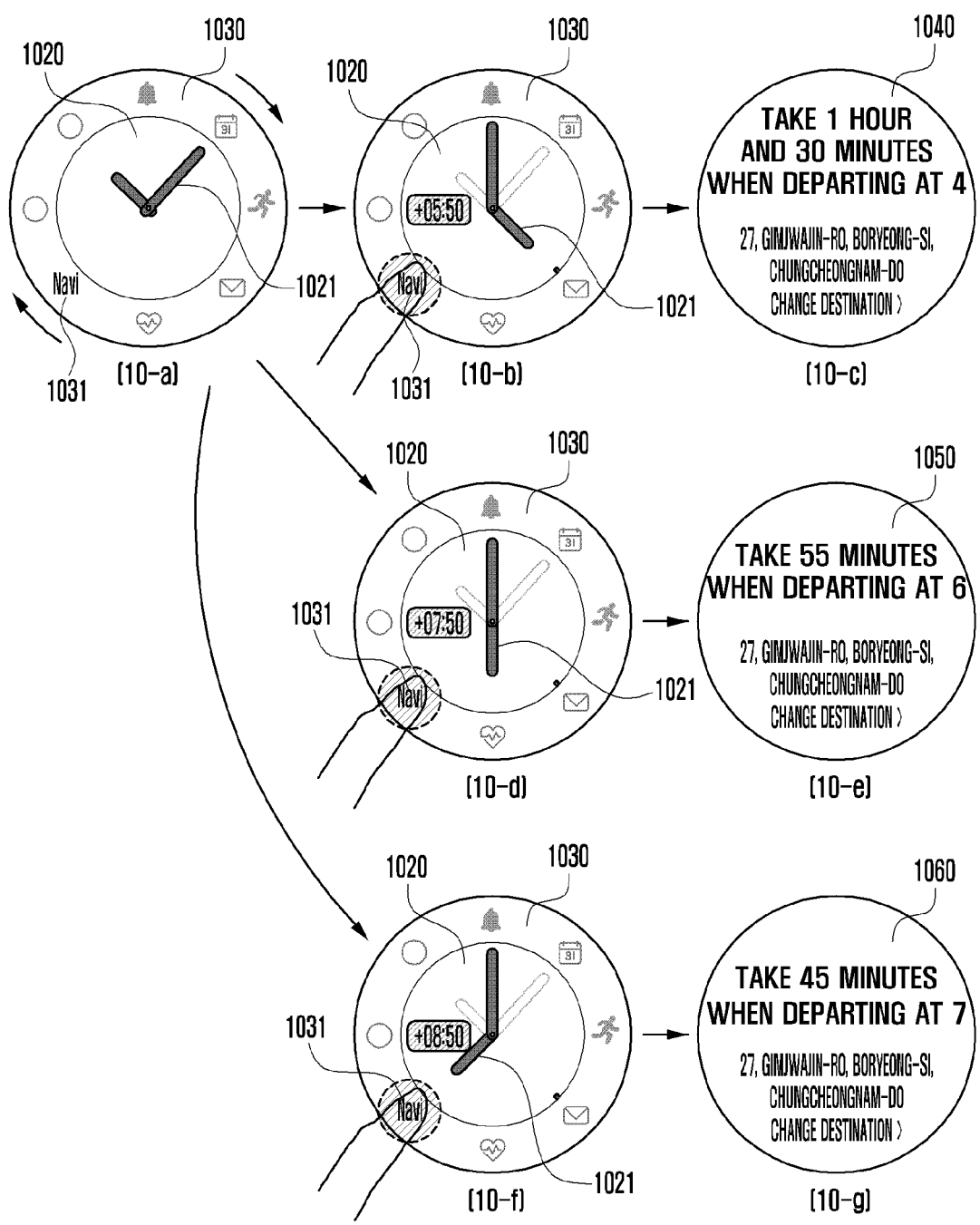
FIG. 10 illustrates user interfaces for providing a configured destination arrival time point according to an embodiment of the disclosure.

FIG. 10 illustrates user interfaces for providing a configured destination arrival time point according to an embodiment of the disclosure.

Referring to FIG. 10, the electronic device 10 may be in a state in which information relating to a destination at which a user is to arrive is pre-stored.

In part (10-a) of FIG. 10, the electronic device 10 may display a virtual watch UI 1020 and an icon list UI 1030. In this case, the electronic device 10 may acquire input data according to a user input of rotating a bezel or dragging at least a part of a virtual watch object 1021 to select a first time point.

According to the input data, as shown in part (10-b) of FIG. 10, while the virtual watch UI 1020 indicates the first time point, the electronic device 10 may acquire input data according to a user input of selecting a navigation icon 1030 from the icon list UI 1030. For example, the electronic device 10 may acquire input data according to a user's touch on the navigation icon 1031.

According to the input data, as shown part (10-c) of FIG. 10, the electronic device 10 may display a traveling time identification screen 1040 including a time interval required to travel from a current user's position to a destination. The traveling time identification screen 1040 may include at least one of an estimated time of arrival at the destination upon the departure at the first time point, destination information, or a destination change UI.

Similarly, when input data according to the user's touch on the navigation icon 1031 is acquired while the virtual watch UI 1020 indicates a second time point as shown in part (10-d) of FIG. 10, the electronic device 10 may display a traveling time identification screen 1050 including an estimated time of arrival at the destination upon the departure at the second time point as shown in part (10-e) of FIG. 10.

In addition, when input data according to the user's touch on the navigation icon 1031 is acquired while the virtual watch UI 1020 indicates a third time point as shown in part (10-f) of FIG. 10, the electronic device 10 may display a traveling time identification screen 1060 including an estimated time of arrival at the destination upon the departure of the third time point as shown in part (10-g) of FIG. 10.

Figure 11:
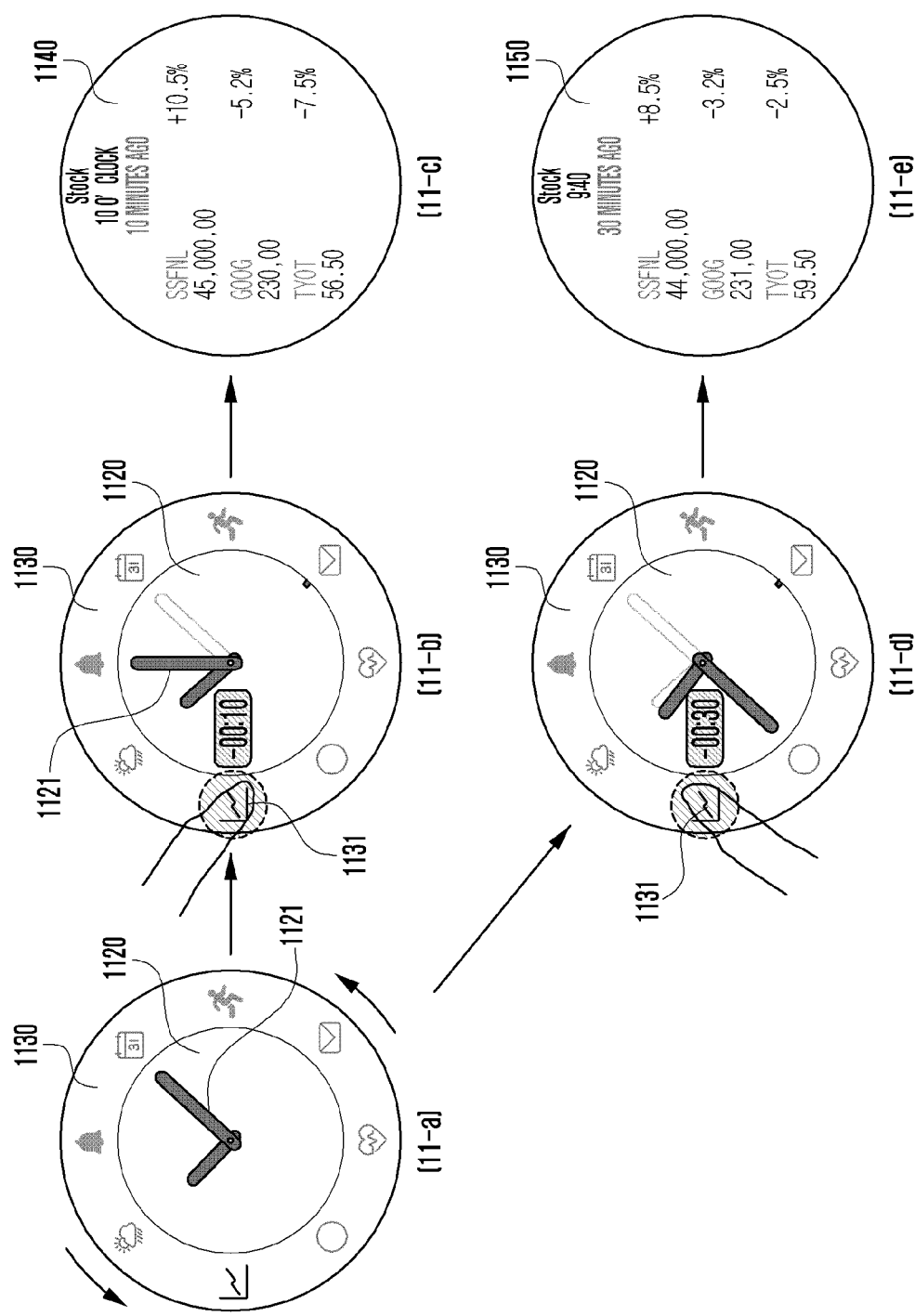
FIG. 11 illustrates user interfaces for providing configured stock information according to an embodiment of the disclosure.

FIG. 11 illustrates user interfaces for providing configured stock information according to an embodiment of the disclosure.

Referring to FIG. 11, the electronic device 10 may be in a state in which information relating to a listed company monitored by a user is preregistered.

In part (11-*a*) of FIG. 11, the electronic device 10 may display a virtual watch UI 1120 and an icon list UI 1130. In this case, the electronic device 10 may acquire input data according to a user input of rotating a bezel or dragging at least a part of a virtual time object 1121 to select a first time point.

According to the input data, as shown in part (11-*b*) of FIG. 11, while the virtual watch UI 1120 indicates the first time point in the past, the electronic device 10 may acquire input data according to a user input of selecting a stock icon 1131 from an icon list UI 1130. For example, the electronic device 10 may acquire input data according to a user's touch on the stock icon 1131.

According to the input data, as shown in part (11-*c*) of FIG. 11, the electronic device 10 may display a stock information screen 1140 of the first time point. The stock information screen 1140 may include stock information relating to the listed company registered by the user, the first time point in the past, a time difference between current time and the first time point, or stock rise/fall information.

Similarly, when input data according to the user's touch on the stock icon 1131 is acquired while the virtual watch UI 1120 indicates a second time point in the past as shown in part (11-*d*) of FIG. 11, the electronic device 10 may display a stock information screen 1150 including stock information at the second time point as shown in part (11-*e*) of FIG. 11.

Figure 12:
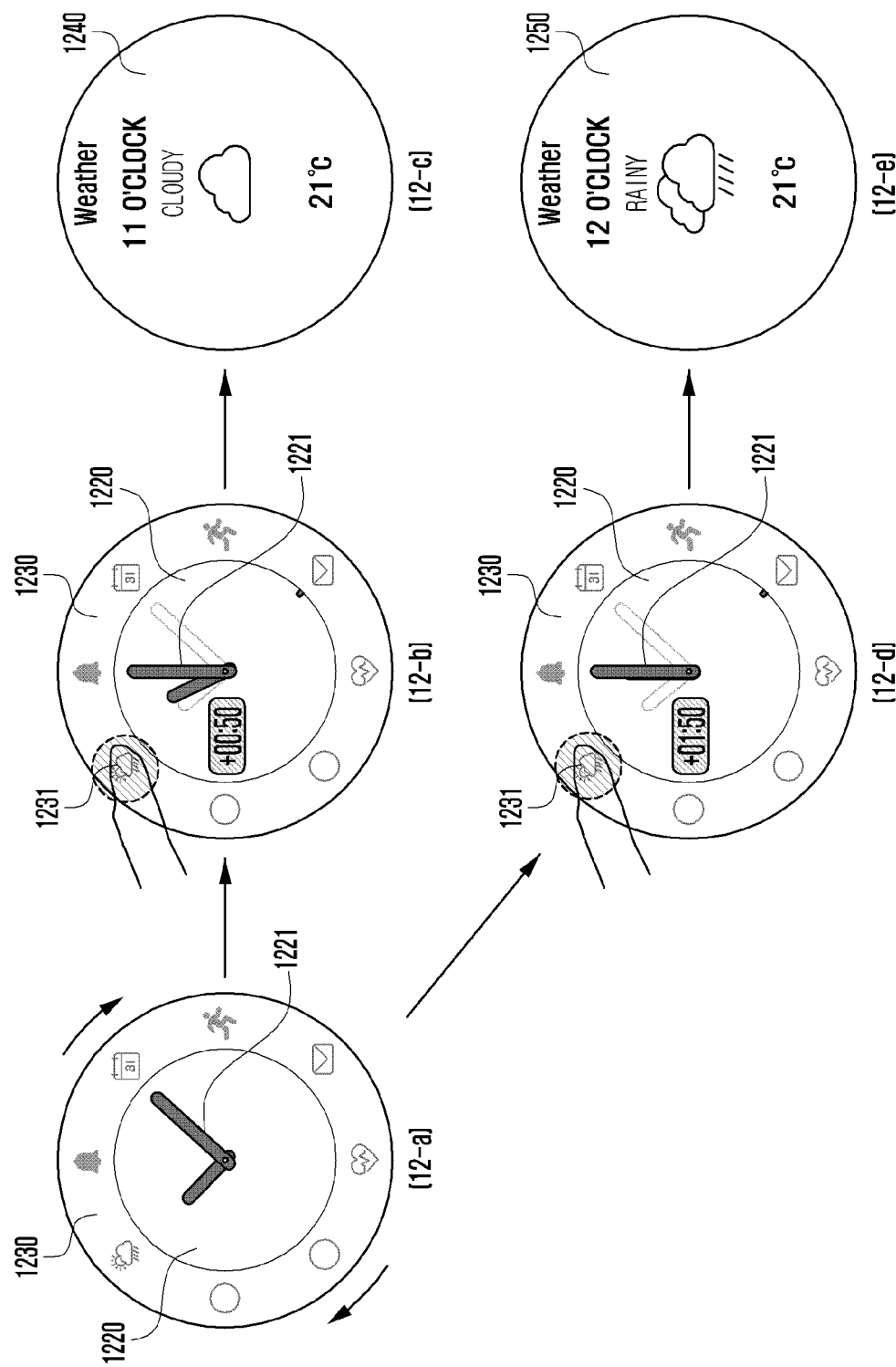
FIG. 12 illustrates user interfaces for providing weather information according to an embodiment of the disclosure.

FIG. 12 illustrates user interfaces for providing weather information according to an embodiment of the disclosure.

Referring to FIG. 12, in part (12-*a*), the electronic device 10 may display a virtual watch UI 1220 and an icon list UI 1230. In this case, the electronic device 10 may acquire input data according to a user input of rotating a bezel or dragging at least a part of a virtual time object 1221 to select a first time point.

According to the input data, as shown in part (12-*b*) of FIG. 12, while the virtual watch UI 1220 indicates the first time point in the past, the electronic device 10 may acquire input data according to a user input of selecting a weather icon 1231 from an icon list UI 1230. For example, the electronic device 10 may acquire input data according to a user's touch on the weather icon 1231.

According to the input data, as shown in part (12-*c*) of FIG. 12, the electronic device 10 may display a weather forecast screen 1240. The weather forecast screen 1240 may include at least one of forecasted weather at the first time point, the first time point, or a forecasted temperature at the first time point.

Similarly, when input data according to the user's touch on the weather icon 1231 is acquired while the virtual watch UI 1220 indicates a second time point as shown in part (12-*d*) of FIG. 12, the electronic device 10 may display a weather forecast screen 1250 including forecasted weather at the second time point as shown in part (12-*e*) of FIG. 12.

Figure 13:
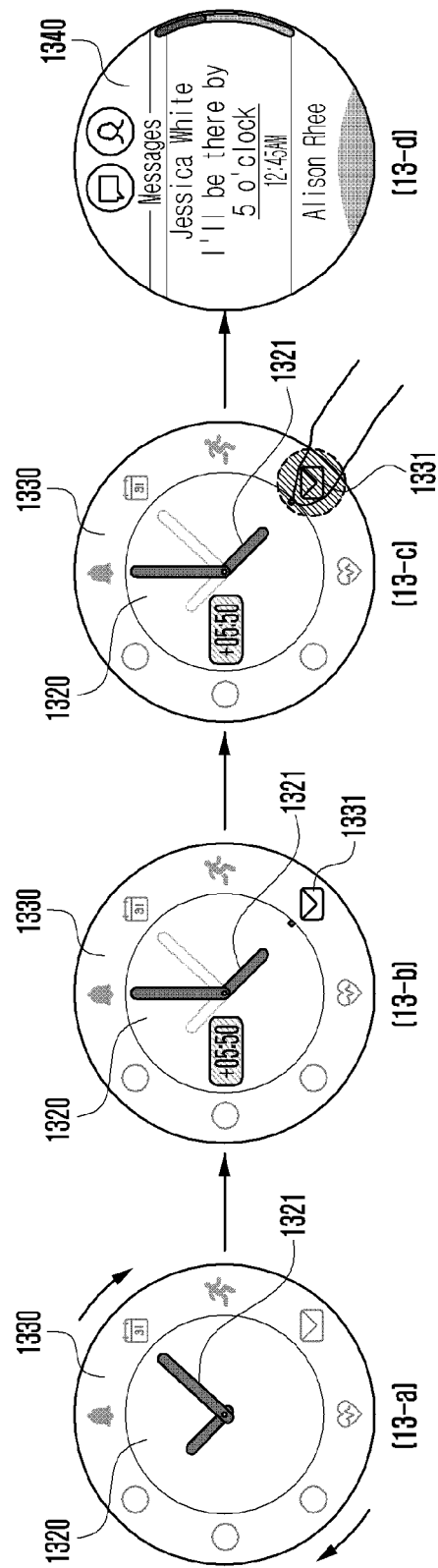
FIG. 13 illustrates user interfaces for providing a message according to an embodiment of the disclosure.

FIG. 13 illustrates user interfaces for providing a message according to an embodiment of the disclosure.

Referring to FIG. 13, in part (13-*a*), the electronic device 10 may display a virtual watch UI 1320 and an icon list UI 1330. In this case, the electronic device 10 may acquire input data according to a user input of rotating a bezel or dragging at least a part of a virtual time object 1321 to select a first time point.

According to the input data, as shown in part (13-*b*) of FIG. 13, while the virtual watch UI 1320 indicates the first time point, the electronic device 10 may highlight a message icon 1331 for indicating whether there is a message related to the first time point.

Accordingly, as shown in part (13-*c*) of FIG. 13, when the user selects the highlighted message icon 1331, the electronic device 10 may acquire input data according the user input. For example, the electronic device 10 may acquire input data according to a user's touch on the message icon 1331.

According to the input data, as shown in part (13-*d*) of FIG. 13, the electronic device 10 may display a detailed message screen 1340. The detailed message screen 1340 may include at least one of a content of a message linked to the first time point, a sender of the message, a recipient of the message, the first time point, or a response UI for providing an interface for responding to the message.

Figure 14:
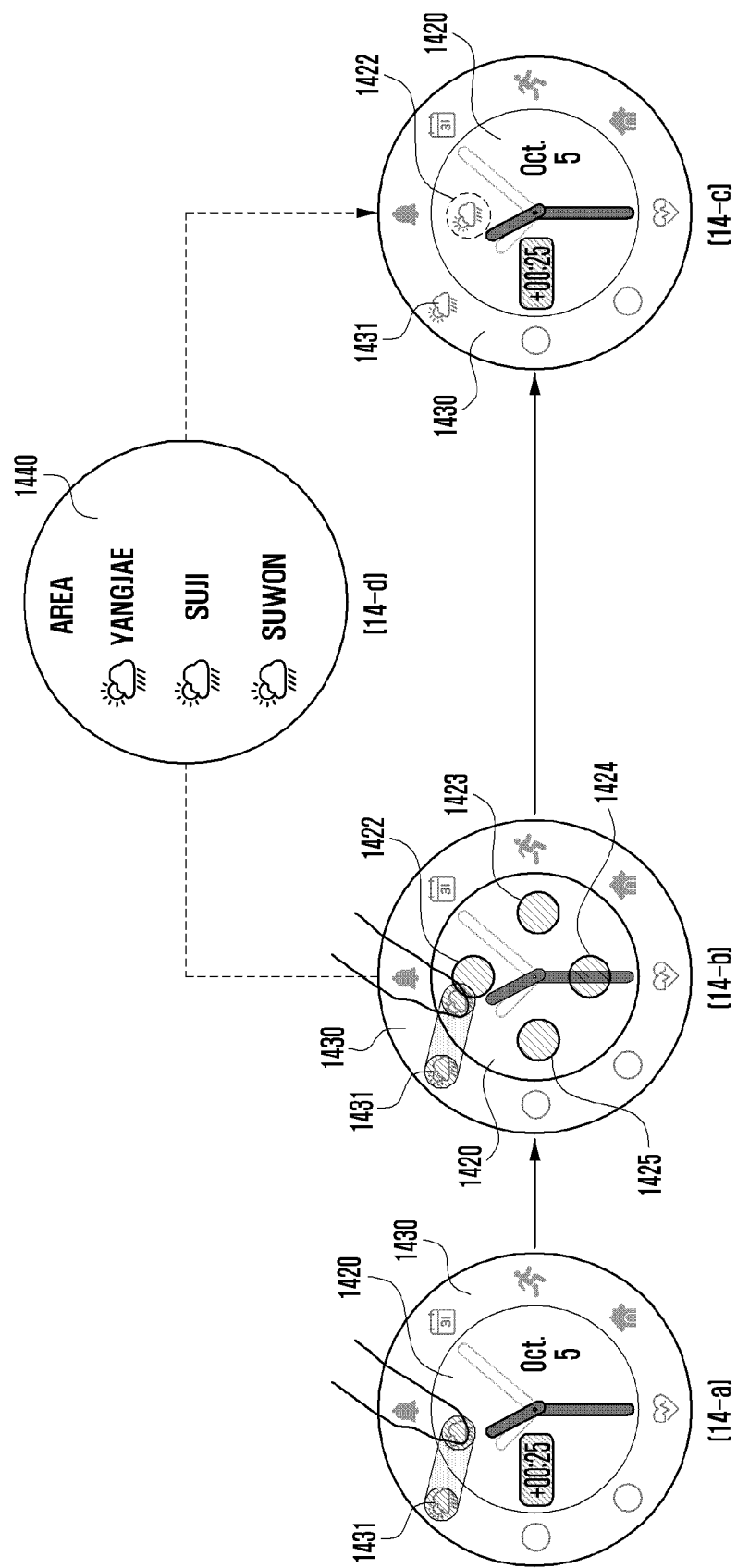
FIG. 14 illustrates user interfaces for configuring complication information according to an embodiment of the disclosure.

FIG. 14 illustrates user interfaces for configuring complication information according to an embodiment of the disclosure.

A complication item may be disposed in the virtual watch UI or the current watch UI and may include an icon identifiable together with time information by the user or complication information provided by a function corresponding to the icon.

Referring to FIG. 14, in part (14-*a*), the electronic device 10 may display a virtual watch UI 1420 and an icon list UI 1430. In this case, the electronic device 10 may acquire input data according to a user input of selecting one icon 1431 (e.g., a weather icon) from multiple icons included in an icon list UI 1430 and dragging the selected icon in the direction of the virtual watch UI 1420.

According to the input data, as shown in part (14-*b*) of FIG. 14, the electronic device 10 may enter a deployment mode in which the complication information can be configured, and highlight deployable areas 1422 to 1425. For example, the electronic device 10 may enter the deployment mode when the dragging of the icon is detected or when the icon moves to an area of the virtual watch UI 1420.

When the user moves one icon 1431 to one deployable area 1422 of the deployable areas 1422 to 1425 and drop (or release the touch on) the icon 1431, the electronic device 10 may deploy the icon 1431 or complication information (e.g., weather information) provided by a function corresponding to the icon 1431, in the area 1442, and may return to the previous state of the deployment mode, as shown in part (14-*c*) of FIG. 14. In this case, the complication information may include information related to the virtual time point indicated by the virtual watch UI 1420. For example, the complication information may include forecasted weather at the virtual time point indicated by the virtual watch UI 1420.

When a detailed configuration for providing the complication information is required, the electronic device 10 may display a detailed configuration screen 1440 as shown in part (14-*d*) of FIG. 14. For example, when the icon 1431 is a weather icon, the electronic device 10 may display pieces of information on multiple areas. When a user input of selecting one piece of information on an area among the pieces of information on multiple areas is received, the electronic device 10 may deploy the complication information (e.g., the weather information) as shown in part (14-*c*) of FIG. 14, in the area 1442, and may return to the previous state of the deployment mode. In this case, the deployed complication information may be complication information to which information configured on the detailed configuration screen is reflected. For example, forecasted weather information in an area selected on the detailed configuration screen 1440 may be displayed on the virtual watch UI 1420 as complication information.

Figure 15:
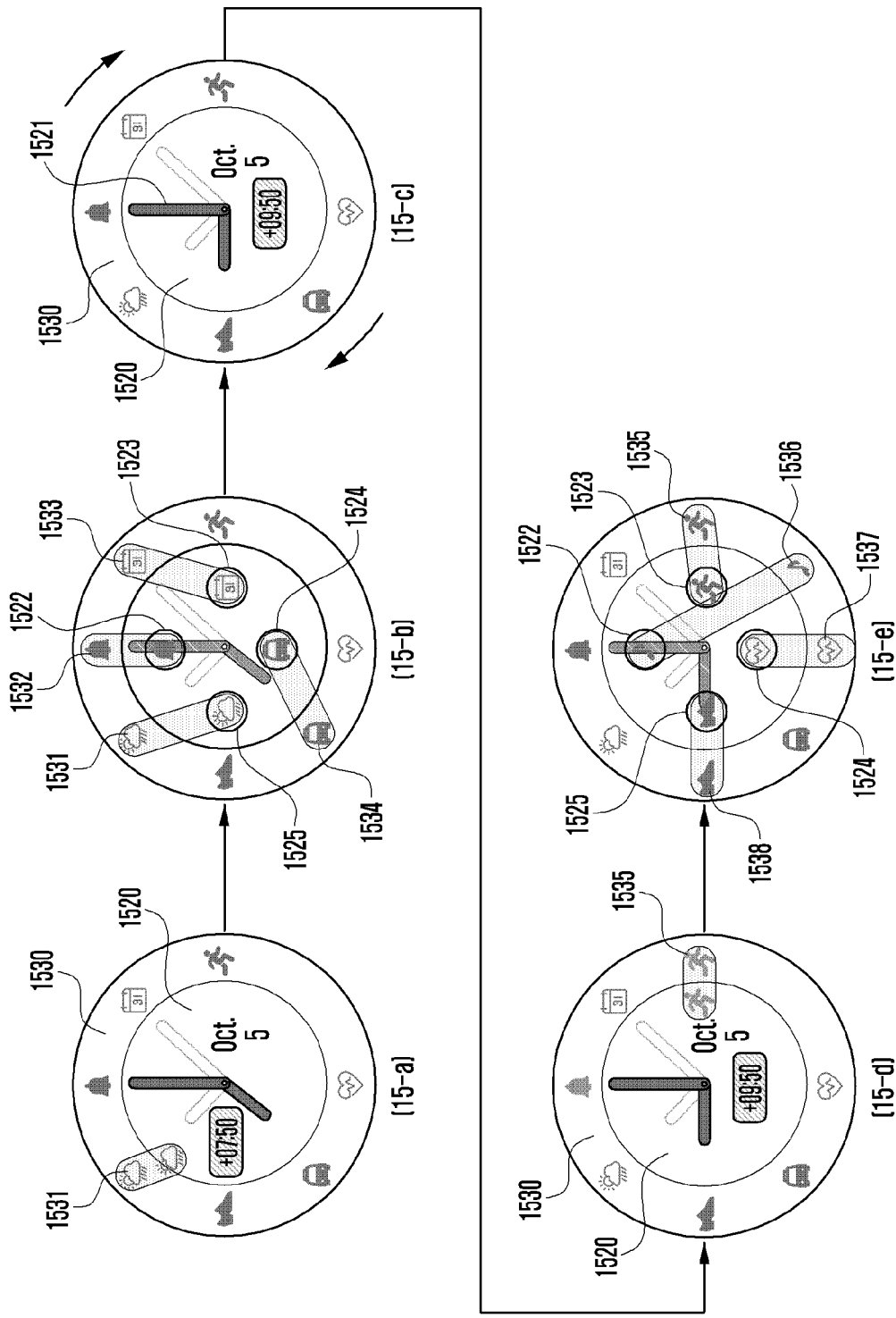
FIG. 15 illustrates user interfaces for configuring time-specific complication information according to an embodiment of the disclosure.

FIG. 15 illustrates user interfaces for configuring time-specific complication information according to an embodiment of the disclosure.

Referring to FIG. 15, in part (15-*a*), the electronic device 10 may display a virtual watch UI 1520 and an icon list UI 1530. In this case, the electronic device 10 may acquire input data according to a user input of configuring the virtual watch UI 1520 to indicate a first time point, selecting one icon 1531 (e.g., a weather icon) from among multiple icons included in an icon list UI 1530, and dragging the selected icon 1531 in the direction of the virtual watch UI 1520.

According to the input data, as shown in part (15-*b*) of FIG. 15, the electronic device 10 may enter a deployment mode in which complication information can be configured with respect to the first time point. When a user selects each of multiple icons 1531 to 1534 and drags the same to each of deployable areas 1522 or 1525, the electronic device 10 may deploy multiple pieces of complication information, which correspond to the respective multiple icons 1531 to 1534, in the deployable areas 1522 to 1525, respectively.

Next, as shown in part (15-*c*) of FIG. 15, the electronic device 10 may acquire input data according to a user input of rotating a bezel or dragging at least a part of a virtual time object 1521 to select a second time point.

According to the input data, as shown in part (15-*d*) of FIG. 15, while the electronic device 10 indicates the second time point, the electronic device 10 may acquire input data according to a user input of selecting one icon 1535 (e.g., a work-out icon) from among multiple icons included in the icon list UI 1530 and dragging the selected icon in the direction of the virtual watch UI 1520.

According to the input data, as shown in part (15-*e*) of FIG. 15, the electronic device 10 may enter a deployment mode in which complication information can be configured with respect to the second time point. When a user selects each of multiple icons 1535 to 1538 and drags the same to each of deployable areas 1522 or 1525, the electronic device 10 may deploy multiple pieces of complication information, which correspond to the respective multiple icons 1535 to 1538, in the deployable areas 1522 to 1525, respectively.

Accordingly, when pieces of complication information are configured with respect to the first time point and the second time point, the electronic device 10 may display pieces of complication information on a screen at the first time point as shown in part (15-*b*) of FIG. 15, and may display pieces of complication information on a screen at the second time point as shown in part (15-*e*) of FIG. 15. For example, the electronic device 10 may display calendar information, bus operation information, reminder information (or alarm information), weather information, and the like on a watch-face screen at the first time point corresponding to a commuting time, and may display work-out information, heart rate information, step count information, music information, and the like on a watch-face screen at the second time point corresponding to a work-out time.

Figure 16:
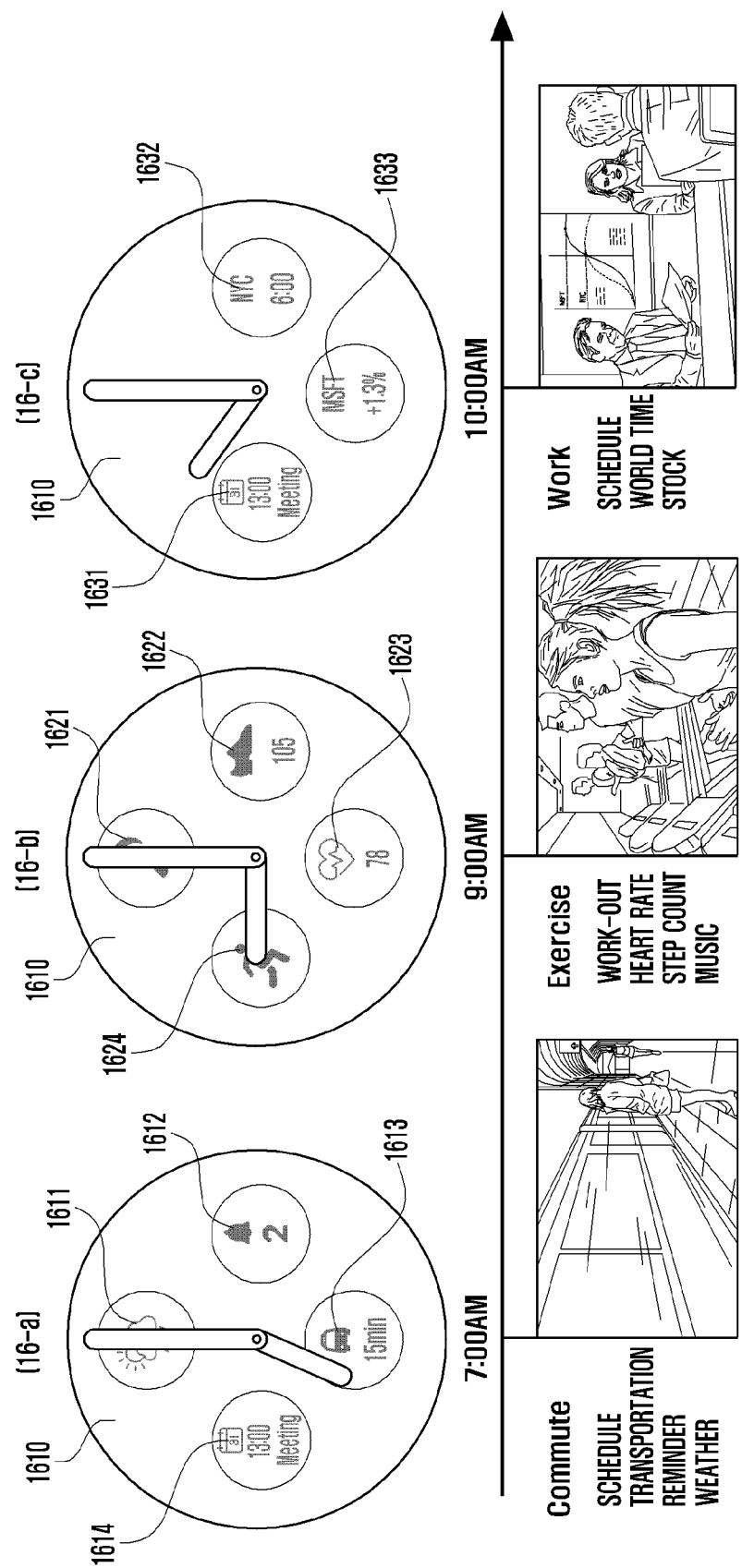
FIG. 16 illustrates user interfaces for providing pieces of time-specific complication information according to an embodiment of the disclosure.

FIG. 16 illustrates user interfaces for providing pieces of time-specific complication information according to an embodiment of the disclosure.

As described above with reference to FIG. 15, in a case in which pieces of time-specific complication information are configured, when the electronic device 10 displays a current watch UI 1610 on a screen, the configured pieces of time-specific information may be provided.

For example, the electronic device 10 may configure different pieces of complication information according to a commuting time, a morning work-out time, and a working time. In this case, when each time point, for which each piece of complication information is configured, comes, the electronic device 10 may display each pieces of complication information configured for each time point.

Referring to FIG. 16, as shown in part (16-*a*), when the time point indicated by the electronic device 10 is 7:00 in the morning, corresponding to the commuting time, the electronic device 10 may display weather information 1611, reminder information (or alarm information) 1612, bus operation information 1613, and calendar information 1614 on the screen. In addition, as shown in part (16-*b*) of FIG. 16, when the time point indicated by the electronic device 10 is 9:00 in the morning, corresponding to the work-out time, the electronic device 10 may display music information 1621, step count information 1622, heart rate information 1623, and work-out information 1624 on the screen. In addition, as shown in part (16-*c*) of FIG. 16., when the time point indicated by the electronic device 10 is 10:00 in the morning, corresponding to the working time, the electronic device 10 may display schedule information 1631, world time information 1632, stock information 1633, and the like on the screen.

Figure 17:
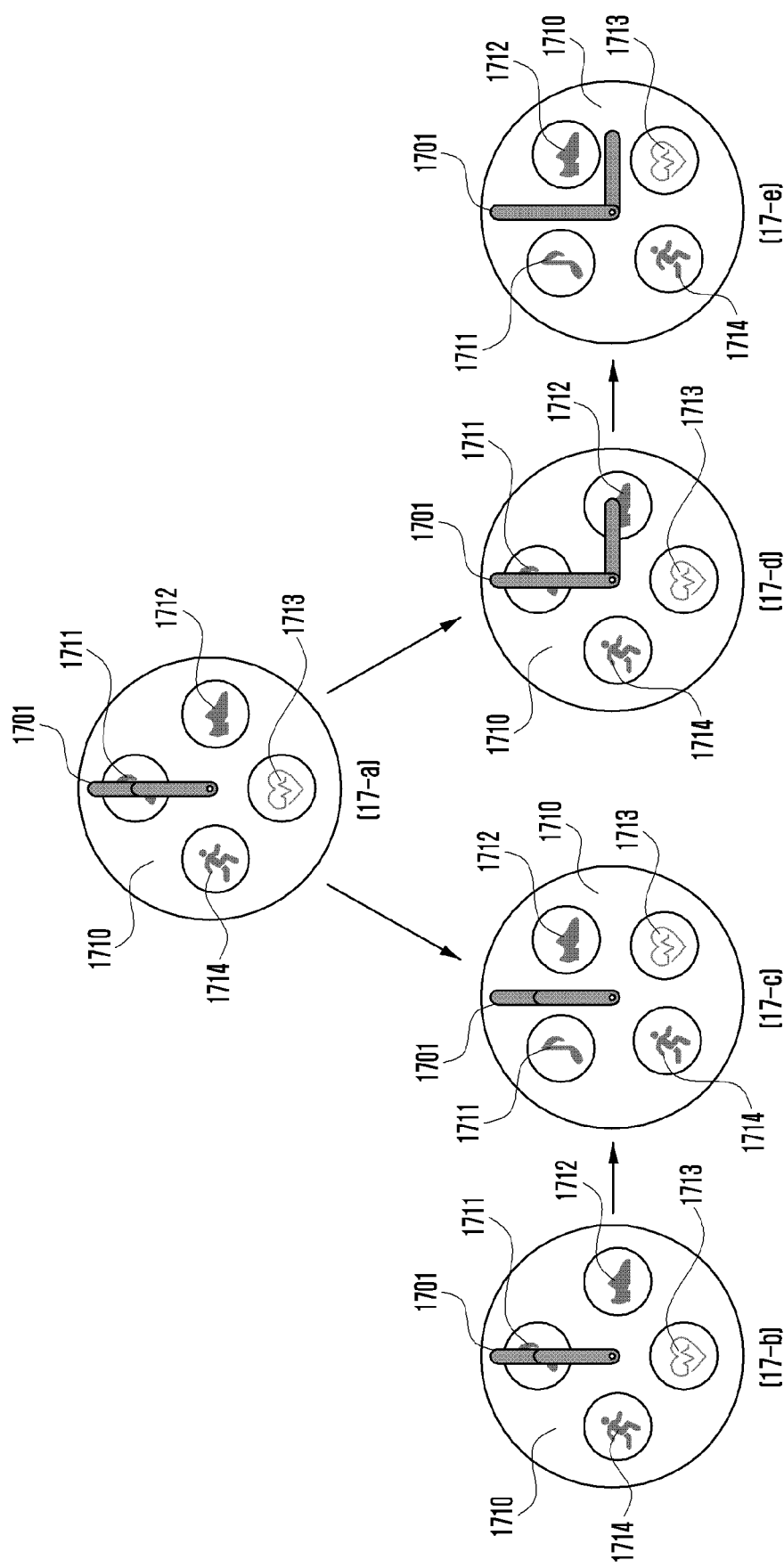
FIG. 17 illustrates user interfaces for changing a deployment of pieces of complication information according to an embodiment of the disclosure.

FIG. 17 illustrates user interfaces for changing a deployment of pieces of complication information according to an embodiment of the disclosure.

When the electronic device 10 displays a current watch UI 1710 on a screen, at least some pieces of complication information 1711 to 1714 may be hidden by a current time object 1701 as shown in part (17-*a*) of FIG. 17. Accordingly, the deployment of the pieces of complication information 1711 to 1714 needs to be changed according to a time point in consideration of the position of the current time object 1701 and the positions of the pieces of complication information 1711 to 1714.

For example, when one piece of complication information 1711 is hidden by the current time object 1701 as shown in part (17-*b*) of FIG. 17, the electronic device 10 may display pieces of complication information 1711 to 1714 on an area remaining after excluding an area in which the current time object 1701 is displayed, so as to prevent the complication information 1711 from being hidden, as shown in part (17-*c*) of FIG. 17. In another example, when multiple pieces of complication information 1711 and 1712 are hidden by the current time object 1701 as shown in part (17-*d*) of FIG. 17, the electronic device 10 may display pieces of complication information 1711 to 1714 on an area remaining after excluding an area in which the current time object 1701 is displayed, so as to prevent the multiple pieces of complication information 1711 and 1712 from being hidden, as shown in part (17-*e*) of FIG. 17.

Figure 18:
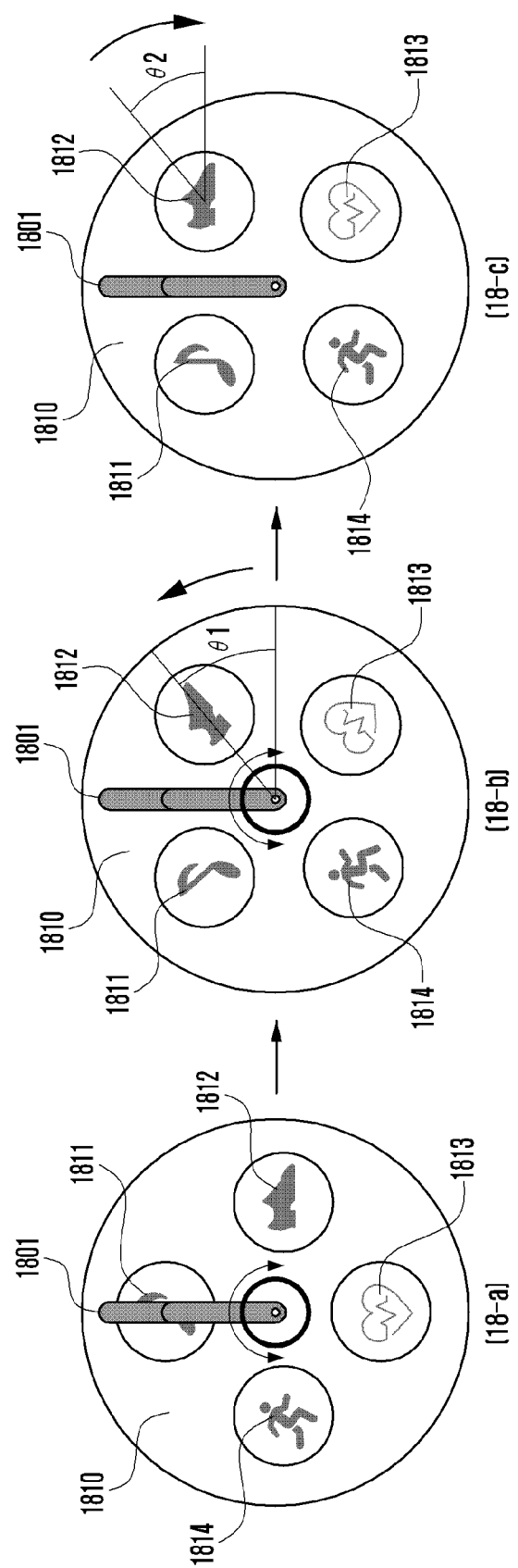
FIG. 18 illustrates user interfaces for changing a deployment of pieces of complication information according to an embodiment of the disclosure.

FIG. 18 illustrates user interfaces for changing a deployment of pieces of complication information according to another embodiment of the disclosure.

As shown in part (18-*a*) of FIG. 18, when the electronic device 10 displays a current watch UI 1810 on a screen, at least some pieces of complication information 1811 to 1814 may be hidden by a current time object 1801. In this case, as shown in part (18-*b*) of FIG. 18, the pieces of complication information 1811 to 1814 may be displayed by rotating the pieces of complication information 1811 to 1814 by a first angle ($\theta 1$) with reference to the center of a watch-face in the direction extending away from the current time object 1801. Further, as shown in part (18-*c*) of FIG. 18, each of the pieces of complication information 1811 to 1814 may be displayed by rotating each piece again by a second angle (θ2) in the direction opposite to the direction above so as to maintain the horizontality. In this case, the size of the first angle (θ1) and the size of the second angle (θ2) may be identical.

According to another embodiment, the pieces of complication information 1811 to 1814 may be fixed for a predetermined time interval after being displayed to extend away from the current time object 1801, or may be displayed by rotating together as the current time object 1801 changes. Alternatively, the pieces of complication information 1811 to 1814 may be displayed by automatically rotating the pieces every predetermined period (e.g., one second).

According to the disclosure, the user may identify (or review) various types of information related to the past, configure various time points related to the future, and predict various types of information, by using the electronic device 10. For example, the user may identify a schedule in the past, reserved information, a work-out history, a stock change trend over time, sensing data (e.g., a temperature/humidity change over time, power consumption, etc.) of the electronic device 10 or another device, and the like, as the various types of information in the past. Further, the user may configure an alarm, register a schedule, make a reservation for working out, make a reservation for device operation, and configure a timer, as a time configuring function related to the future. Furthermore, as information related to the future, the user may easily identify an estimated time of arrival, a weather forecast over time, and a reserved schedule.

Figure 19:
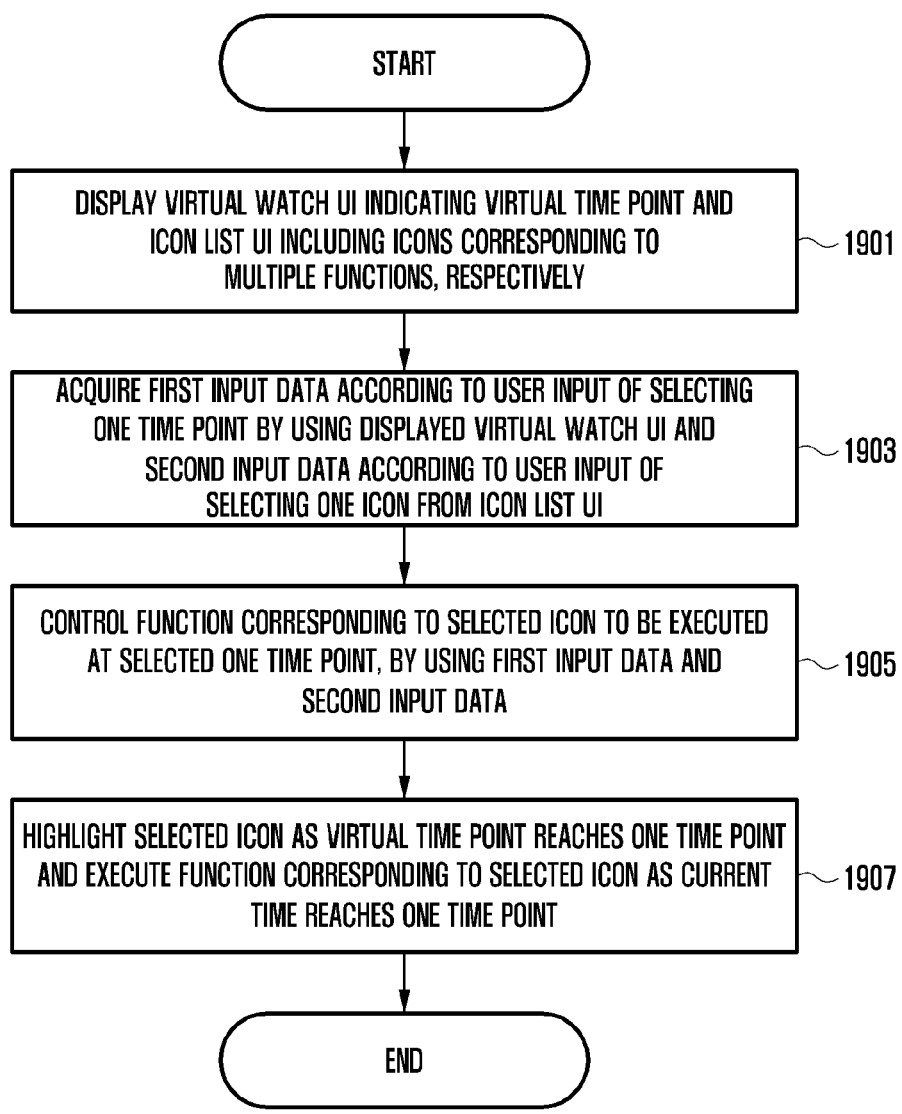
FIG. 19 is a flow chart of an electronic device executing a function according to an embodiment of the disclosure.

FIG. 19 is a flow chart of an electronic device executing a function according to an embodiment of the disclosure.

Referring to FIG. 19, at operation 1901, the electronic device 10 may display a virtual watch UI indicating a virtual time point, and an icon list UI including icons corresponding to multiple functions, respectively. In this case, the virtual time point may correspond to a time point identical to current time or a time point configured in advance, and the virtual watch UI may include a UI obtained by downsizing a current watch UI indicating the current time. In addition, the icon list UI may be displayed on a display by surrounding the virtual watch UI 320.

In operation 1903, the electronic device 10 may acquire first input data according to a user input of selecting one time point by using the displayed virtual watch UI, and second input data according to a user input of selecting one icon from the icon list UI. In this case, the second input data may include first input data according to a user input of dragging at least a part of a virtual time object included in the virtual watch UI, or rotating a bezel of the electronic device 10.

In operation 1905, the electronic device 10 may control a function corresponding to the selected icon to be executed at the selected one time point, by using the first input data and the second input data. For example, the electronic device 10 may configure an application for providing a function, or may be transmit information on the one time point to an external device including the application for providing the function, so as to execute the function at the one time point. In this case, the electronic device 10 may further display a detailed configuration screen for configuring a detailed function related to a function corresponding to an icon and provided at the one time point. In addition, the electronic device 10 may further display a configuration identification screen indicating that the function corresponding to the icon is configured to be executed at the one time point. In addition, the electronic device 10 may further display at least one of a time difference between the selected one time point and the current time and the date of the one time.

In operation 1907, the electronic device 10 may highlight the selected icon as the virtual time point reaches the one time point, and may configure the function corresponding to the selected icon as the current time reaches the one time point.

In this case, when the selected icon is highlighted as the virtual time point reaches the one time point, the electronic device 10 may display a screen including information related to the one time point by using the input data according to a user input of selecting the highlighted icon.

According to various embodiments, the electronic device 10 may display information related to the one time point on the icon list UI when the virtual time point reaches the one time point.

Figure 20:
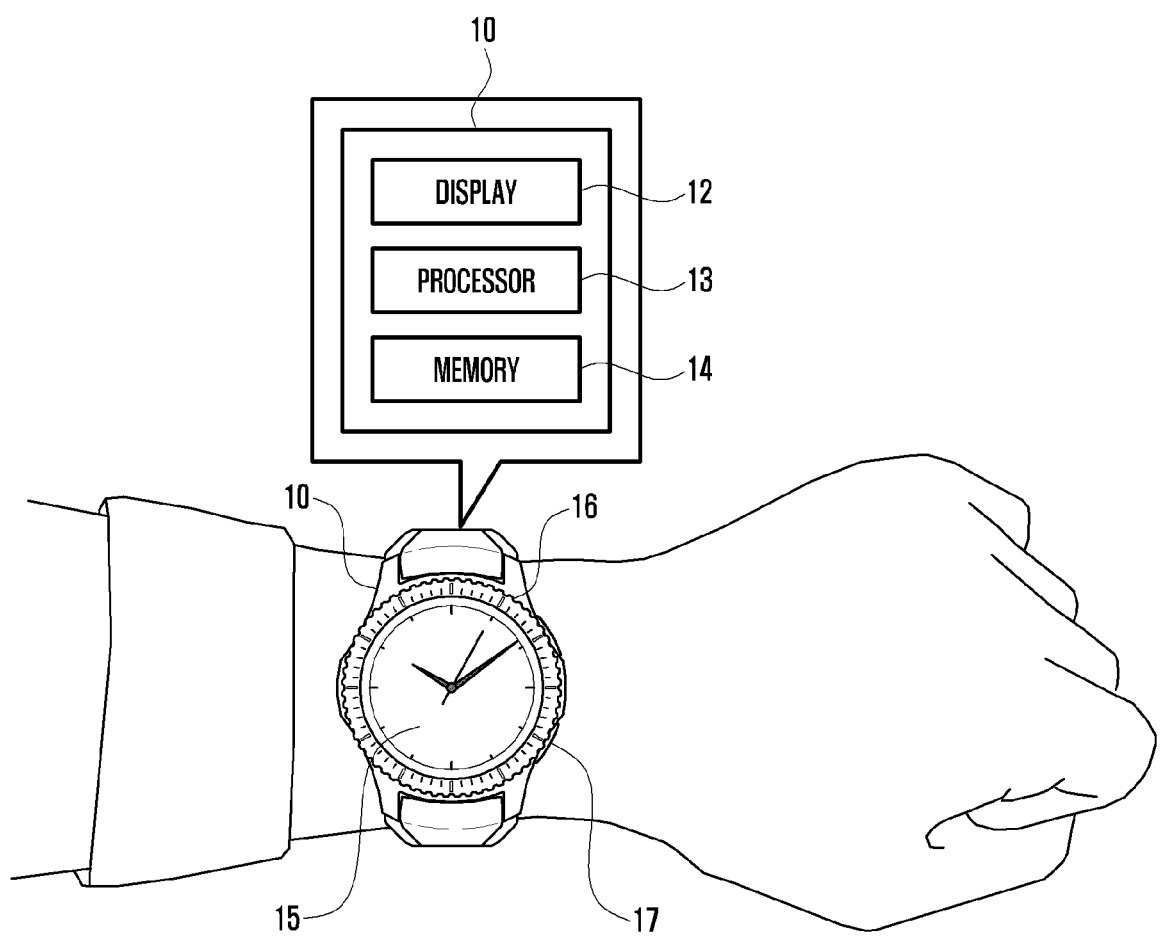
FIG. 20 is a schematic block diagram of an electronic device according to an embodiment of the disclosure.

FIG. 20 is a schematic block diagram of an electronic device according to an embodiment of the disclosure.

In FIG. 20, it is assumed that the electronic device 10 is implemented as a wearable device (e.g., a smart watch), but the technical idea of the disclosure may be applied to various types of electronic devices as described in FIG. 1A above.

Referring to FIG. 20, the electronic device 10 may include a display 12, a processor 13, and a memory 14.

The display 12 may display data or information by a control of the processor 13. According to the control of the processor 13, the display 12 may display data or information stored in the electronic device 10 or an external device. The display 12 may display data or information provided by at least one application stored in the memory 14, by the control of the processor 13. In addition, the display 12 may display an execution screen and/or an execution state of at least one application by the control of the processor 13. Alternatively, the display 12 may display a user interface for performing a function of the electronic device 10 by the control of the processor 13. For example, the display 12 may display a virtual watch UI, an icon list UI, and/or a current watch UI.

The processor 13 may control an overall operation of the electronic device 10. For example, the processor 13 may copy various software programs or instructions stored in the memory 14 to an RAM, and execute and perform various operations. According to an embodiment, the processor 13 may include the above-described UI component module of FIG. 1A.

Specifically, at least one processor 13 may control the display 12 to display the virtual watch UI indicating the virtual time point and the icon list UI including icons corresponding to multiple functions, respectively. The at least one processor 13 may control, by using first input data according to a user input of selecting one time point by using the virtual watch UI and second input data according to a user input of selecting one icon from the icon list UI, a function corresponding to the selected icon to be executed at the selected one time point. The at least one processor 13 may highlight the selected icon when the virtual time reaches the one time point, and execute the function corresponding to the selected icon when the current time reaches the one time point.

The memory 14 may store various software programs (or applications) for operating the electronic device 10, and data and instructions for operating the electronic device 10. At least some of the programs may be downloaded from an external server through wireless or wired communication. The memory 14 may be accessed by the processor 13, and the processor 13 may read/record/revise/delete/update the software programs, data, and instructions included in the memory 14.

Specifically, the memory 14 may store at least one instruction configured to, when executed, cause the at least one processor 13 to: control the display 12 to display the virtual watch UI indicating the virtual time point and the icon list UI including icons corresponding to multiple functions, respectively; control, by using first input data according to a user input of selecting one time point by using the displayed virtual watch UI and second input data according to a user input of selecting one icon from the icon list UI, a function corresponding to the selected icon to be executed at the selected on time point; highlight the selected icon when the virtual time point reaches the one time point; and execute the function corresponding to the selected icon when the current time reaches the one time point.

In addition, the memory 14 may store at least one instruction configured to cause the at least one processor 13 to control the display 12 to display a screen including information related to the one time, by using input data according to a user input of selecting a highlighted icon when the selected icon is highlighted.

In addition, the memory 14 may store at least one instruction configured to cause the at least one processor 13 to configure, when the function corresponding to the selected icon is controlled to be executed at the one time point, an application for providing a function or control the communication unit to transmit information on the one time point to an external device including an application for providing the function, so that the function is to be executed at the one time point.

In addition, the memory 14 may store at least one instruction configured to cause the at least one processor 13 to control the display 12 to display a configuration identification screen indicating that the function corresponding to the icon is configured to be executed at the one time point.

In addition, the memory 14 may store at least one instruction configured to cause the at least one processor 13 to control the display 12 to display information related to the one time point on the icon list UI when the virtual time point reaches the one time point.

In addition, the memory 14 may store at least one instruction configured to cause the at least one processor 13 to control the display 12 to display a detailed configuration screen for configuring a detailed function related to a function corresponding to an icon and provided at the one time point.

In addition, the memory 14 may store at least one instruction configured to cause the at least one processor 13 to control the display 12 to display at least one of a time difference between the selected one time point and the current time or the date of the one time point.

According to various embodiments, the electronic device 10 may further include a user input unit.

The user input unit may include, for example, at least one of a touch panel 15, a first input unit 16, or a second input unit 17. The user input unit may provide the processor 13 with input data according to a user input through at least one of the touch panel 15, the first input unit 16, or the second input unit 17.

For example, the touch panel 15 may be laminated on the display 12 and have a form of a touchscreen. In this case, at least one of a touch input, a drag input (or a touch-drag input), a swipe input, and a pinch input of a user on the touchscreen may be received, and input data according to the user input may be provided for the processor 13.

The first input unit 16 may be implemented to have a form of a bezel of a watch and generate input data according to a user input. The user may rotate the first input unit 16 in a first direction (for example, a clockwise direction) or a second direction (for example, a counter-clockwise direction), and the first input unit 16 may generate input data corresponding to the rotation and provide the processor 13 with the generated input data. Alternatively, the first input unit 16 may be implemented to be a touch panel corresponding to a bezel surface of a watch and generate input data according to a user input. The user may perform touch-dragging in the first direction (for example, a clockwise direction) or the second direction (for example, a counter-clockwise direction) along the bezel surface, and the first input unit 16 may generate input data corresponding to the touch-dragging and provide the processor 13 with the generated input data.

The second input unit 17 may be implemented to have a form of the stem of a watch and generate input data according to a user input. The user may rotate or press the second input unit 17, and the second input unit 17 may generate input data corresponding to the rotation or the pressing and provide the processor 13 with the generated input data.

Figure 21:
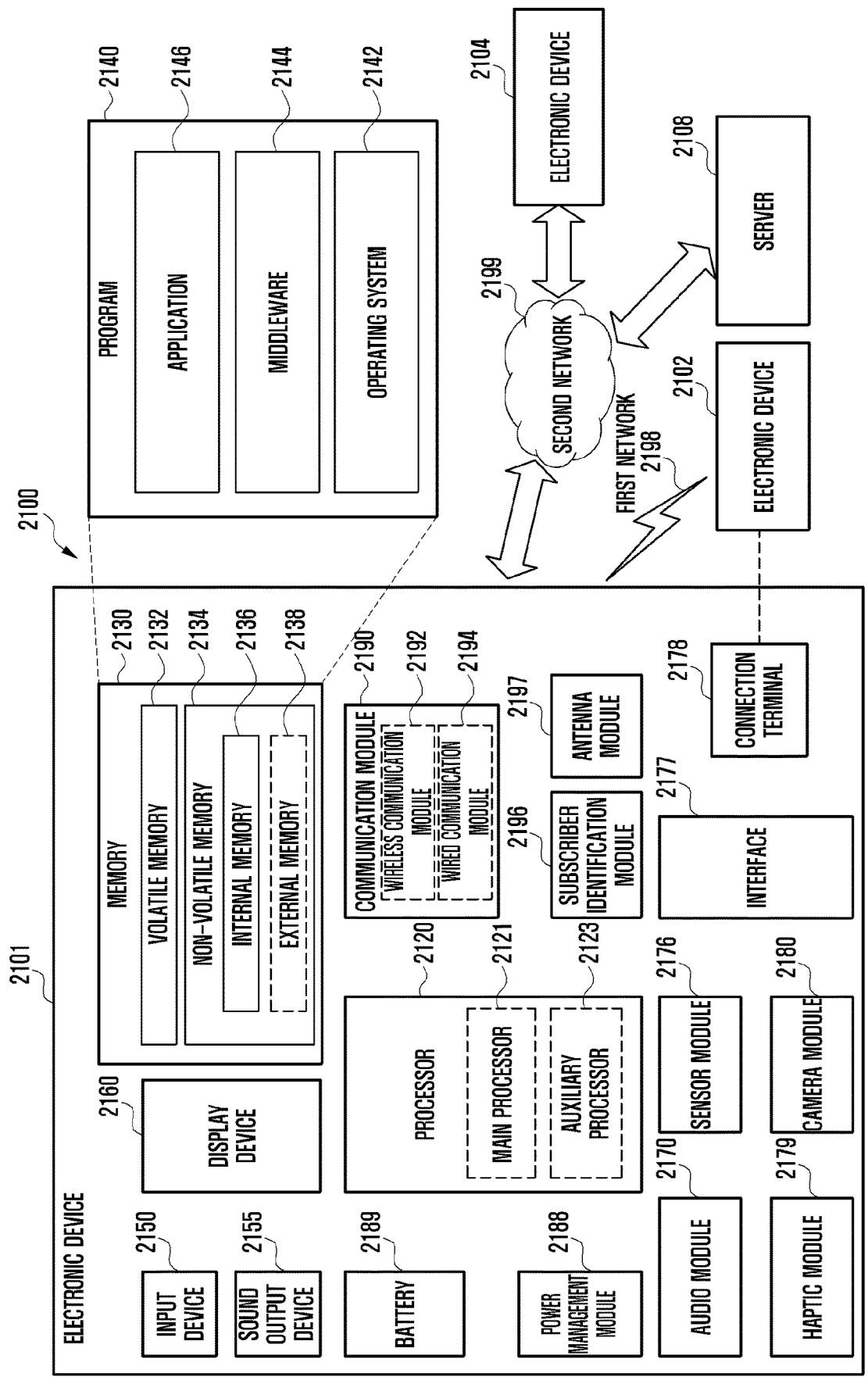
FIG. 21 is a block diagram of an electronic device in a network environment according to an embodiment.

FIG. 21 is a block diagram illustrating an electronic device 2101 (e.g., the electronic device 10 of FIG. 20) in a network environment 2100 according to various embodiments. Referring to FIG. 21, the electronic device 2101 in the network environment 2100 may communicate with an electronic device 2102 via a first network 2198 (e.g., a short-range wireless communication network), or an electronic device 2104 or a server 2108 via a second network 2199 (e.g., a long-range wireless communication network). According to an embodiment, the electronic device 2101 may communicate with the electronic device 2104 via the server 2108. According to an embodiment, the electronic device 2101 may include a processor 2120, memory 2130, an input device 2150, a sound output device 2155, a display device 2160, an audio module 2170, a sensor module 2176, an interface 2177, a haptic module 2179, a camera module 2180, a power management module 2188, a battery 2189, a communication module 2190, a subscriber identification module (SIM) 2196, or an antenna module 2197. In some embodiments, at least one (e.g., the display device 2160 or the camera module 2180) of the components may be omitted from the electronic device 2101, or one or more other components may be added in the electronic device 2101. In some embodiments, some of the components may be implemented as single integrated circuitry. For example, the sensor module 2176 (e.g., a fingerprint sensor, an iris sensor, or an illuminance sensor) may be implemented as embedded in the display device 2160 (e.g., a display).

The processor 2120 (e.g., the processor 13 of FIG. 20) may execute, for example, software (e.g., a program 2140) to control at least one other component (e.g., a hardware or software component) of the electronic device 2101 coupled with the processor 2120, and may perform various data processing or computation. According to one embodiment, as at least part of the data processing or computation, the processor 2120 may load a command or data received from another component (e.g., the sensor module 2176 or the communication module 2190) in volatile memory 2132, process the command or the data stored in the volatile memory 2132, and store resulting data in non-volatile memory 2134. According to an embodiment, the processor 2120 may include a main processor 2121 (e.g., a central processing unit (CPU) or an application processor (AP)), and an auxiliary processor 2123 (e.g., a graphics processing unit (GPU), an image signal processor (ISP), a sensor hub processor, or a communication processor (CP)) that is operable independently from, or in conjunction with, the main processor 2121. Additionally or alternatively, the auxiliary processor 2123 may be adapted to consume less power than the main processor 2121, or to be specific to a specified function. The auxiliary processor 2123 may be implemented as separate from, or as part of the main processor 2121.

The auxiliary processor 2123 may control at least some of functions or states related to at least one component (e.g., the display device 2160, the sensor module 2176, or the communication module 2190) among the components of the electronic device 2101, instead of the main processor 2121 while the main processor 2121 is in an inactive (e.g., sleep) state, or together with the main processor 2121 while the main processor 2121 is in an active state (e.g., executing an application). According to an embodiment, the auxiliary processor 2123 (e.g., an image signal processor or a communication processor) may be implemented as part of another component (e.g., the camera module 2180 or the communication module 2190) functionally related to the auxiliary processor 2123.

The memory 2130 (e.g., the memory 14 of FIG. 20) may store various data used by at least one component (e.g., the processor 2120 or the sensor module 2176) of the electronic device 2101. The various data may include, for example, software (e.g., the program 2140) and input data or output data for a command related thereto. The memory 2130 may include the volatile memory 2132 or the non-volatile memory 2134.

The program 2140 may be stored in the memory 2130 as software, and may include, for example, an operating system (OS) 2142, middleware 2144, or an application 2146.

The input device 2150 (e.g., the touch panel 15, the first input unit 16, or the second input unit 17 of FIG. 20) may receive a command or data to be used by other component (e.g., the processor 2120) of the electronic device 2101, from the outside (e.g., a user) of the electronic device 2101. The input device 2150 may include, for example, a microphone, a mouse, a keyboard, or a digital pen (e.g., a stylus pen).

The sound output device 2155 may output sound signals to the outside of the electronic device 2101. The sound output device 2155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 2160 (e.g. the display) may visually provide information to the outside (e.g., a user) of the electronic device 2101. The display device 2160 may include, for example, a display, a hologram device, or a projector and control circuitry to control a corresponding one of the display, hologram device, and projector. According to an embodiment, the display device 2160 may include touch circuitry adapted to detect a touch, or sensor circuitry (e.g., a pressure sensor) adapted to measure the intensity of force incurred by the touch.

The audio module 2170 may convert a sound into an electrical signal and vice versa. According to an embodiment, the audio module 2170 may obtain the sound via the input device 2150, or output the sound via the sound output device 2155 or a headphone of an external electronic device (e.g., an electronic device 2102) directly (e.g., wiredly) or wirelessly coupled with the electronic device 2101.

The sensor module 2176 may detect an operational state (e.g., power or temperature) of the electronic device 2101 or an environmental state (e.g., a state of a user) external to the electronic device 2101, and then generate an electrical signal or data value corresponding to the detected state. According to an embodiment, the sensor module 2176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2177 may support one or more specified protocols to be used for the electronic device 2101 to be coupled with the external electronic device (e.g., the electronic device 2102) directly (e.g., wiredly) or wirelessly. According to an embodiment, the interface 2177 may include, for example, a high definition multimedia interface (HDMI), a universal serial bus (USB) interface, a secure digital (SD) card interface, or an audio interface.

A connecting terminal 2178 may include a connector via which the electronic device 2101 may be physically connected with the external electronic device (e.g., the electronic device 2102). According to an embodiment, the connecting terminal 2178 may include, for example, a HDMI connector, a USB connector, a SD card connector, or an audio connector (e.g., a headphone connector).

The haptic module 2179 may convert an electrical signal into a mechanical stimulus (e.g., a vibration or a movement) or electrical stimulus which may be recognized by a user via his tactile sensation or kinesthetic sensation. According to an embodiment, the haptic module 2179 may include, for example, a motor, a piezoelectric element, or an electric stimulator.

The camera module 2180 may capture a still image or moving images. According to an embodiment, the camera module 2180 may include one or more lenses, image sensors, image signal processors, or flashes.

The power management module 2188 may manage power supplied to the electronic device 2101. According to one embodiment, the power management module 2188 may be implemented as at least part of, for example, a power management integrated circuit (PMIC).

The battery 2189 may supply power to at least one component of the electronic device 2101. According to an embodiment, the battery 2189 may include, for example, a primary cell which is not rechargeable, a secondary cell which is rechargeable, or a fuel cell.

The communication module 2190 may support establishing a direct (e.g., wired) communication channel or a wireless communication channel between the electronic device 2101 and the external electronic device (e.g., the electronic device 2102, the electronic device 2104, or the server 2108) and performing communication via the established communication channel. The communication module 2190 may include one or more communication processors that are operable independently from the processor 2120 (e.g., the application processor (AP)) and supports a direct (e.g., wired) communication or a wireless communication. According to an embodiment, the communication module 2190 may include a wireless communication module 2192 (e.g., a cellular communication module, a short-range wireless communication module, or a global navigation satellite system (GNSS) communication module) or a wired communication module 2194 (e.g., a local area network (LAN) communication module or a power line communication (PLC) module). A corresponding one of these communication modules may communicate with the external electronic device via the first network 2198 (e.g., a short-range communication network, such as Bluetooth™, wireless-fidelity (Wi-Fi) direct, or infrared data association (IrDA)) or the second network 2199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 2192 may identify and authenticate the electronic device 2101 in a communication network, such as the first network 2198 or the second network 2199, using subscriber information (e.g., international mobile subscriber identity (IMSI)) stored in the subscriber identification module 2196.

The antenna module 2197 may transmit or receive a signal or power to or from the outside (e.g., the external electronic device) of the electronic device 2101. According to an embodiment, the antenna module 2197 may include an antenna including a radiating element composed of a conductive material or a conductive pattern formed in or on a substrate (e.g., PCB). According to an embodiment, the antenna module 2197 may include a plurality of antennas. In such a case, at least one antenna appropriate for a communication scheme used in the communication network, such as the first network 2198 or the second network 2199, may be selected, for example, by the communication module 2190 (e.g., the wireless communication module 2192) from the plurality of antennas. The signal or the power may then be transmitted or received between the communication module 2190 and the external electronic device via the selected at least one antenna. According to an embodiment, another component (e.g., a radio frequency integrated circuit (RFIC)) other than the radiating element may be additionally formed as part of the antenna module 2197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 2101 and the external electronic device 2104 via the server 2108 coupled with the second network 2199. Each of the electronic devices 2102 and 2104 may be a device of a same type as, or a different type, from the electronic device 2101. According to an embodiment, all or some of operations to be executed at the electronic device 2101 may be executed at one or more of the external electronic devices 2102, 2104, or 2108. For example, if the electronic device 2101 should perform a function or a service automatically, or in response to a request from a user or another device, the electronic device 2101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 2101. The electronic device 2101 may provide the outcome, with or without further processing of the outcome, as at least part of a reply to the request. To that end, a cloud computing, distributed computing, or client-server computing technology may be used, for example.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 2140) including one or more instructions that are stored in a storage medium (e.g., the memory 14, internal memory 2136 or external memory 2138) that is readable by a machine (e.g., the electronic device 10 or the electronic device 2101). For example, a processor(e.g., the processor 13 or the processor 2120) of the machine (e.g., the electronic device 10 or the electronic device 2101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A method for executing a function of an electronic device, the method comprising:
   displaying a virtual watch user interface (UI) indicating a virtual time point and an icon list UI comprising icons corresponding to multiple functions, respectively;
   acquiring first input data according to a first user input of selecting specific time point by touching and dragging a virtual time object of the displayed virtual watch UI;
   acquiring second input data according to a second user input of selecting an icon from the icon list UI;
   setting a function corresponding to the selected icon to be executed at the selected specific time point, by using the first input data and the second input data;
   highlighting the selected icon of the displayed icon list UI, when the virtual time object is moved to the specific time point according to a third user input; and
   executing the function corresponding to the selected icon as current real time reaches the specific time point.

2. The method of claim 1, further comprising, when the selected icon of the displayed icon list UI is highlighted, displaying a screen comprising information related to the specific time point by using input data according to a fourth user input of selecting the highlighted icon.

3. The method of claim 1, wherein the controlling setting of the function corresponding to the selected icon to be executed at the selected specific time point comprises configuring an application for providing the function or transmitting information on the specific time point to an external device comprising an application for providing the function, so that the function is executed at the specific time point.

4. The method of claim 1, further comprising:
   displaying a configuration identification screen indicating that the function corresponding to the selected icon is configured to be executed at the specific time point; and
   displaying information related to the specific time point on the icon list UI when the virtual time reaches the specific time point.

5. The method of claim 1, further comprising:
   displaying a detailed configuration screen for configuring a detailed function related to the function corresponding to the selected icon and provided at the specific time point; and
   displaying at least specific of a time difference between the selected specific time point and current time or a date of the specific time point.

6. The method of claim 1, wherein the virtual time point initially corresponds to a pre-configured time point or a time point identical to the current time and movable by the third user input, and the virtual watch UI comprises a UI obtained by downsizing a current watch UI indicating the current time.

7. An electronic device comprising:
   a display;
   at least one processor coupled to the display; and
   memory storing instructions which, when executed by the at least one processor, cause the electronic device to:
   control the display to display a virtual watch user interface (UI) indicating a virtual time point and an icon list UI comprising icons corresponding to multiple functions, respectively,
   acquiring first input data according to a first user input of selecting specific time point by touching and dragging a virtual time object of the displayed virtual watch UI,
   acquiring second input data according to a second user input of selecting an icon from the icon list UI,
   setting a function corresponding to the selected icon to be executed at the selected specific time point by using the first input data and the second input data,
   highlight the selected icon of the displayed icon list UI, when the virtual time object is moved to the specific time point according to a third user input, and
   execute the function corresponding to the selected icon when current real time reaches the specific time point.

8. The electronic device of claim 7, wherein the memory stores at least one instruction configured to further cause the at least one processor to control the display to display a screen comprising information related to the specific time point, by using input data according to a fourth user input of selecting the highlighted icon of the displayed icon list UI.

9. The electronic device of claim 7, wherein the memory stores at least one instruction configured to further cause the at least one processor to, when the function corresponding to the selected icon is controlled to be executed at the selected specific time point, configure an application for providing the function, or control a communication unit to transmit information on the specific time point to an external device comprising an application for providing the function, so that the function is executed at the specific time point.

10. The electronic device of claim 7, wherein the memory stores at least one instruction configured to further cause the at least one processor to:
    control the display to display a configuration identification screen indicating that the function corresponding to the selected icon is configured to be executed at the specific time point, and
    control the display to display information related to the specific time point on the icon list UI when the virtual time point reaches the specific time point.

11. The electronic device of claim 7, wherein the memory stores at least one instruction configured to further cause the at least one processor to:
    control the display to display a detailed configuration screen for configuring a detailed function related to the function corresponding to the selected icon and provided at the specific time point, and
    control the display to display at least specific of a time difference between the selected specific time point and current time or a date of the specific time point.

12. The electronic device of claim 7, wherein the virtual time point initially corresponds to a pre-configured time point or a time point identical to the current time and movable by the third user input, and the virtual watch UI comprises a UI obtained by downsizing a current watch UI indicating the current time.

13. A non-transitory computer-readable recording medium storing at least one instruction, when executed by an electronic device, cause the electronic device to perform the method of claim 1.

* * * * *